(12) United States Patent
Tummala et al.

(10) Patent No.: US 12,730,754 B1
(45) Date of Patent: Sep. 8, 2026

(54) DISTRIBUTED VIRTUAL MEMORY MANAGEMENT

(71) Applicant: Arm Limited, Cambridge (GB)

(72) Inventors: Ashok Kumar Tummala, Cedar Park, TX (US); Leif Christian Bagge, Austin, TX (US); Randall John Pascarella, Round Rock, TX (US); Jamshed Jalal, Austin, TX (US); Christopher William Laycock, Austin, TX (US); Pranav Lalan, Austin, TX (US); Rushit Umesh Shah, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 19/070,725

(22) Filed: Mar. 5, 2025

(51) Int. Cl.
*G06F 12/00* (2006.01)
*G06F 12/0831* (2016.01)
*G06F 13/16* (2006.01)

(52) U.S. Cl.
CPC ...... *G06F 12/0831* (2013.01); *G06F 13/1642* (2013.01)

(58) Field of Classification Search
None
See application file for complete search history.

(56) References Cited

U.S. PATENT DOCUMENTS 8,656,117 B1 2/2014 Wong et al.
11,531,620 B2 12/2022 Jagadeesha et al.
2020/0301854 A1* 9/2020 Ramagiri ............ G06F 12/0833
2022/0308997 A1* 9/2022 Jagadeesha ......... G06F 12/0833
2022/0382703 A1* 12/2022 Hayes ................ G06F 12/0862
(Continued)

OTHER PUBLICATIONS

"Arm Neoverse CMN S3(AE) Coherent Mesh Network," https://developer.arm.com/documentation/107858/0200/?lang=en, Revision r2p0, Technical Reference Manual, Issue 04, Oct. 31, 2023.
(Continued)

*Primary Examiner* — Daniel D Tsui
(74) *Attorney, Agent, or Firm* — Leveque Intellectual Property Law, P.C.

(57) ABSTRACT

An integrated circuit data processing system comprises a plurality of request nodes, a plurality of DVM nodes, assignment logic, an interconnect system and a first chip-to-chip gateway. A first request node is configured to send a DVM message to the DVM node, and the DVM node is configured, in response, to send a first category of snoop message to one or more peer DVM nodes. A second DVM node, is configured, in response, to send a second category of snoop message to request nodes within the domain of the second DVM node and a third category of snoop message to a DVM node of a second integrated circuit. The first chip-to-chip gateway is configured, upon receipt of a snoop message from the second integrated circuit, to send a DVM message to the second DVM node, and the second DVM node is configured, in response, to send a fourth category of snoop message to one or more peer DVM nodes. A peer DVM node, in response, is configured to send a second category of snoop message to request nodes within the domain of the peer DVM node.

20 Claims, 9 Drawing Sheets

(56) References Cited

U.S. PATENT DOCUMENTS

2023/0221866 A1 7/2023 Jalal et al.

OTHER PUBLICATIONS

"Arm Neoverse CMN-650 Coherent Mesh Network," https://developer.arm.com/documentation/101481/0200/What-is-CMN-650-, Revision r2p0, Technical Reference Manual, Issue 04, Aug. 11, 2021.

C. J. Glass and L. M. Ni, "The Turn Model for Adaptive Routing," Proceedings the 19th Annual International Symposium on Computer Architecture, Gold Coast, QLD, Australia, May 19-21, 1992, pp. 278-287, doi: 10.1109/ISCA.1992.753324.

Arm Limited, "AMBA CHI Chip-to-Chip," URL: https://documentation-service.arm/statis/691c2cfd69f16e048ca621a4, Feb. 28, 2024.

* cited by examiner

DISTRIBUTED VIRTUAL MEMORY MANAGEMENT

TECHNICAL FIELD

The present invention relates to an integrated circuit data processing system, a method for managing distributed virtual memory (DVM) in a data processing network and a data processing network.

BACKGROUND OF THE INVENTION

A data processing network may include a number of request nodes, such as processing cores, which initiate data transactions, and nodes that provide endpoints for transactions initiated by the request nodes, wherein the nodes are coupled by an interconnect fabric. The request nodes may have access to a shared memory, such as system memory, and may include local memory, such as one or more caches.

By use of a logical abstraction layer, the local memories, together with other memories such as system memories, may be accessed as a distributed virtual memory (DVM). This reduces the need for a processor to access slower memory or storage and improves system performance. The distributed virtual memory must be managed to ensure that data is processed consistently and that out of date copies of data are not used.

Some or all messages for operations related to management of the DVM may be handled by a DVM node. The DVM node receives a DVM message from a request node, completes the requested action, and returns a response to the originating request node.

As the number of request nodes in a network increases, the DVM node can become a point of congestion for messages in the network. Furthermore, in some existing DVM handling schemes, for certain network layouts, propagation of snoop requests may be sub-optimal, for example resulting in deadlock loops or not fully propagating a DVM message as is desirable. It is an aim of the present invention to provide an integrated circuit data processing system and a data processing network providing improved management of distributed virtual memory management messages.

SUMMARY OF THE INVENTION

From a first aspect, the invention provides an integrated circuit data processing system comprising:

a plurality of request nodes, each request node including a local memory, the local memories of the plurality of request nodes accessible as a distributed virtual memory (DVM);

a plurality of DVM nodes, where the local memory of a request node is accessible by other request nodes via one or more DVM nodes of the plurality of DVM nodes;

assignment logic configured to assign one or more request nodes of the plurality of request nodes to each DVM node of the plurality of DVM nodes to form a DVM domain for each DVM node;

an interconnect system operatively coupling the one or more request nodes in a DVM domain to the DVM node in the DVM domain and operatively coupling between the DVM nodes; and a first chip-to-chip gateway;

wherein a first request node in a first-request-node DVM domain is configured to send a DVM message to the DVM node of the first-request-node DVM domain to request a DVM operation, and wherein the DVM node of the first-request-node DVM domain is configured, in response, to:

send a first category of snoop message to one or more peer DVM nodes in DVM domains other than the first-request-node DVM domain;

wherein a second DVM node, of the one or more peer DVM nodes, is configured, in response to receiving a snoop message belonging to the first category of snoop message, to:

send a second category of snoop message to request nodes within the domain of the second DVM node;

send a third category of snoop message to a DVM node of a second integrated circuit, wherein the first chip-to-chip gateway is operatively coupled to the second DVM node and wherein the snoop message is sent via the first chip-to-chip gateway of the first integrated circuit; and wherein the first chip-to-chip gateway is configured, upon receipt of a snoop message from the second integrated circuit, to send a DVM message to the second DVM node, and wherein the second DVM node is configured, in response, to:

send a fourth category of snoop message to one or more peer DVM nodes in DVM domains other than the DVM domain of the second DVM node;

wherein a peer DVM node, in response to receiving a snoop message belonging to the fourth category, is configured to send a second category of snoop message to request nodes within the domain of the peer DVM node.

The first aspect of the invention extends to a method for managing distributed virtual memory (DVM) in a data processing network having a plurality of request nodes and a plurality of DVM nodes, the distributed virtual memory associated with local memories of the plurality of request nodes, the method comprising:

assigning a plurality of DVM domains, each DVM domain including a DVM node of the plurality of DVM nodes and one or more request nodes of the plurality of request nodes, the plurality of DVM nodes including a first DVM node in a first-request-node DVM domain;

sending, by a first request node in the first-request-node DVM domain to the first DVM node, a DVM message to request a DVM operation;

sending, by the first DVM node in response to the DVM message, a first category of snoop message to one or more peer DVM nodes in DVM domains other than the first-request-node DVM domain;

sending, by a second DVM node of the one or more peer DVM nodes responsive to receiving the first category of snoop message, a second category of snoop message to request nodes within the domain of the second DVM node and a third category of snoop message to a DVM node of a second integrated circuit, wherein the first chip-to-chip gateway is operatively coupled to the second DVM node and wherein the snoop message is sent via the first chip-to-chip gateway of the first integrated circuit;

receiving, by the first chip-to-chip gateway a snoop message from the second integrated circuit;

sending, by the first chip-to-chip gateway in response to the snoop message a DVM message to the second DVM node;

sending, by the second DVM node responsive to receiving the DVM message, a fourth category of snoop message to one or more peer DVM nodes in DVM domains other than the DVM domain of the second DVM node;

sending, by a peer DVM node responsive to receiving the fourth category of snoop message, a second category of snoop message to request nodes within the domain of the peer DVM node.

From a second aspect, the invention provides a data processing network, comprising:

a hub data processing network;

a first branch integrated-circuit data processing system; and a second branch integrated-circuit data processing system;

the hub data processing network comprising:

a plurality of request nodes, each request node including a local memory, the local memories of the plurality of request nodes accessible as a distributed virtual memory (DVM);

a plurality of DVM nodes, where the local memory of a request node is accessible by other request nodes via one or more DVM nodes of the plurality of DVM nodes;

assignment logic configured to assign one or more request nodes of the plurality of request nodes to each DVM node of the plurality of DVM nodes to form a DVM domain for each DVM node;

an interconnect system operatively coupling the one or more request nodes in a DVM domain to the DVM node in the DVM domain and operatively coupling between the DVM nodes;

wherein the first branch integrated circuit data processing system is connected to a first DVM domain of the hub data processing network through a first-branch-circuit chip-to-chip gateway of the first branch integrated circuit and a first hub chip-to-chip gateway of the hub data processing network;

wherein the second branch integrated circuit data processing system is connected to a second DVM domain of the hub data processing network through a second-branch-circuit chip-to-chip gateway of the second branch integrated circuit and a second hub chip-to-chip gateway of the hub data processing network;

wherein the first branch integrated circuit data processing system and the second branch integrated circuit data processing system are connected only through the hub data processing network;

wherein the DVM node of the first DVM domain is configured to treat the first hub chip-to-chip gateway, with respect to DVM messages received from the first hub chip-to-chip gateway requesting a DVM operation, and snoop messages sent to the first hub chip-to-chip gateway by the DVM node, as a request node within the first DVM domain; and wherein the DVM node of the second DVM domain is configured to treat the second hub chip-to-chip gateway, with respect to DVM messages received from the second hub chip-to-chip gateway requesting a DVM operation, and snoop messages sent to the second hub chip-to-chip gateway by the DVM node, as a request node within the second DVM domain.

BRIEF DESCRIPTION OF THE DRAWINGS

An embodiment of the invention will now be described, by way of example only, with reference to the accompanying drawings, in which.

DETAILED DESCRIPTION

Figure 1:
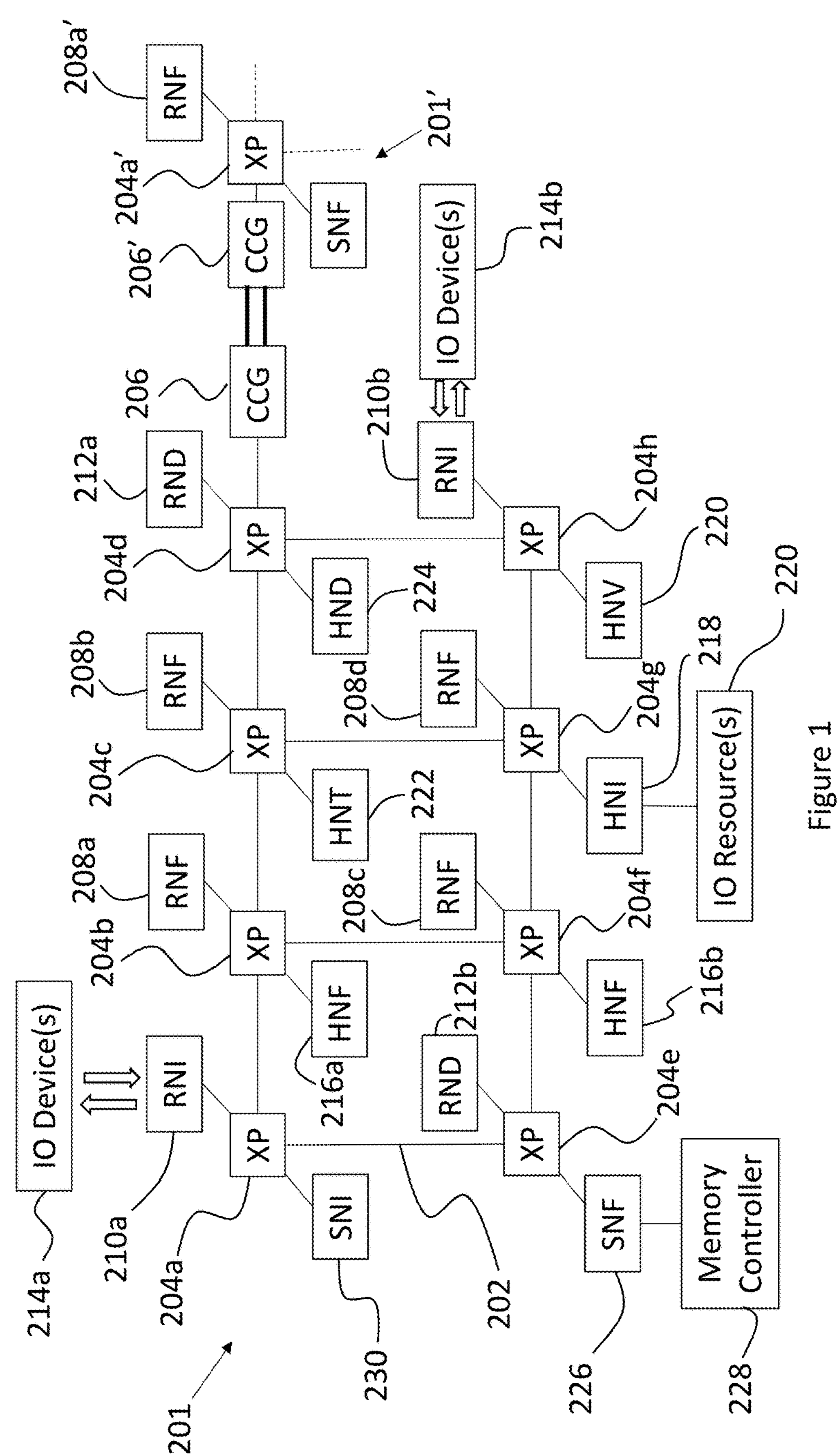
FIG. 1 is a schematic diagram showing an integrated circuit data processing system to which the invention may be applied.

According to the first aspect, four different categories (i.e. types) of snoop message are generated within the integrated circuit data processing system, under various circumstances. In particular, DVM nodes are arranged to send snoops of a first category to peer DVM nodes in the same integrated-circuit. This first category of snoop message may be referred to as a peer-local snoop message. The first category of snoop message causes the receiving DVM node to send a second category of snoop message to request nodes within its domain and to send a third category of snoop message DVM node(s) of a separate (i.e. remote) integrated circuit. The second category of snoop message may be referred to as a local snoop message. The third category of snoop message may be referred to as a remote snoop message.

Conversely, when a (i.e. at least one) DVM node receives a DVM message via a chip-to-chip gateway from another integrated circuit, it sends a fourth category of snoop message to its peer DVM node(s), responsive to which these peer DVM nodes send (i.e. only) a second category (i.e. local) snoop message to nodes in their respective domains. The fourth category of snoop message may be referred to as a peer-remote snoop message.

Thus, snoops to peer DVM nodes are categorised differently depending on whether they originate from a peer DVM node of the same integrated circuit, or from a remote circuit via a CCG, and furthermore, based on these different categories, different types of ongoing snoop message are generated by the receiving node—with peer-local snoop messages giving rise to both local and remote snoops, whereas peer-remote snoop messages give rise only to local snoops (and not remote snoops, i.e. snoops to chip-to-chip gateways in the domain of the particular DVM node). This helps to avoid issues of clashes between snoops which may cause a deadlock situation and also unending loops of snoop messages, as explained further below.

Assignment logic is configured to assign request nodes to a DVM node to form a DVM domain for each DVM node (i.e. one DVM node per DVM domain, with each request node assigned only to one particular domain). It will be understood that logic described herein (e.g. assignment logic, arbitration logic) may be provided by associated circuitry (e.g. assignment circuitry, arbitration circuitry).

It is stated that DVM nodes are configured to send out certain snoop messages in response to receiving a certain message or snoop. Taking an action in response to something will be understood as meaning that the device ultimately carries out the stated action as a direct result of the stated cause occurring (i.e. receipt of the message of the stated type), but that no particular time constraint is implied. Thus, the resulting message need not be output immediately upon receipt of the trigger—for example there may be delays e.g. due to latency, lack of resources, etc.

In some embodiments, the DVM node of the first-request-node DVM domain is configured, responsive to receipt of the DVM message from the first request node, to additionally send a second category of snoop message to request nodes, other than the first request node, in the first-request-node DVM domain. Thus, in addition to sending out peer-local requests to peer DVM nodes of other domains (in the same integrated circuit) in response to a request from a requestor in its own domain, a DVM node may also send out local requests to request nodes within its own domain.

In some embodiments, the second DVM node is configured, responsive to receipt of a DVM message from a request node in the domain of the second DVM node (i.e. a local request), to send a third category of snoop message to a DVM node of the second integrated circuit, wherein the snoop message is sent via the first chip-to-chip gateway. Thus, for a DVM node with a chip-to-chip gateway within its domain, in addition to sending out first category (i.e. peer-local) snoops (and optionally also second category snoops as set out above), it may further send out third category snoop messages (i.e. remote) to a separate, remote integrated circuit via the chip-to-chip gateway.

This behaviour is described in reference to the second DVM node, which is already defined as being connected to a chip-to-chip gateway within its DVM domain, but it will be understood that any (optionally all) DVM nodes having at least one chip-to-chip gateway in their respective domain may be configured to have this behaviour in respect of some or all of the gateways in their domain. Notably, some DVM nodes may be configured to override this behaviour (for some or all gateways in their domain) and treat the chip-to-chip gateway(s) as local, as is described below in relation to the second aspect.

In some embodiments, the second DVM node is configured, responsive to receiving the DVM message from the first chip-to-chip gateway, to additionally send a second category of snoop message to request nodes within the domain of the second DVM node. Thus, responsive to a remote request received from the gateway, the DVM node may send local requests to nodes within its own domain (in addition to sending fourth category, peer-remote snoop messages to its peer DVM nodes).

In some embodiments, each of the plurality of DVM nodes comprises a first tracker, for tracking outstanding snoop messages belonging to the first category, a second tracker, for tracking outstanding snoop messages belonging to the second category, a third tracker, for tracking outstanding snoop messages belonging to the third category, and a fourth tracker, for tracking outstanding snoop messages belonging to the fourth category. This may help to more easily track each of the different categories of snoop message described above. Each of these trackers may be independent from each of the others, i.e. so each category of snoop message is tracked independently.

In some embodiments, each of the DVM nodes is configured to transmit snoop messages, responsive to a particular received DVM message or snoop message, in each of the categories independently. As a result of transmitting each category of snoop message independently of transmitting the other categories of snoop request, the DVM node doesn't need to wait until it is able to transmit all of the categories in order to transmit any. Rather, when one category (e.g. peer-local, to all peer DVM nodes) is ready for transmission, this can be transmitted, even if another category (e.g. local, to all request nodes in the domain) cannot yet be transmitted (e.g. due to capacity issues for that type of receiver). Thus, the DVM node need not have credits for all groups of receiver in order to transmit any of the snoop messages, which would significantly delay the process.

In some embodiments, each of the DVM nodes comprises arbitration logic configured to determine a snoop message for transmission, the arbitration logic comprising at least one stage at which snoop messages belonging to different categories are arbitrated independently. Arbitrating each category independently (in at least one stage) helps to prevent one category from overwhelming the others.

In some embodiments, each of the DVM nodes is configured to limit a number of outstanding snoop messages of each category issued by the DVM node to a respective independent threshold associated with each category, by limiting a count of outstanding snoop messages of each category to a respective threshold value. Thus, the DVM node limits the amount of each category of snoop message which it has outstanding at a given time. This helps to prevent one category of snoop message from overwhelming the system's resources.

In some embodiments, each category of snoop message comprises a first sub-category, of synchronisation snoop message, and a second sub-category, of non-synchronisation snoop message, wherein each of the DVM nodes is configured to limit a number of outstanding snoop messages of each sub-category independently. These sub-categories may correspond to DVM Non-Sync (also referred to as Op) and DVM Sync, the two types of DVM operation defined in the CHI specification.

Synchronisation snoop messages may be those which perform synchronisation with no other operation. They check that all previously issued DVM operations have been completed. Thus, only one synchronisation may be outstanding, and so the DVM operation must finish executing before more DVM operations can be issued.

Non-Synchronization DVMs may include multiple types of invalidation operations—such as for a translation lookaside buffer (TLB), Physical and/or Virtual Instruction Cache, and Branch Predictor. Non-Synchronization DVMs do not require the DVM operation to finish executing before more DVM operations are issued, and do not require the DVM operation to be executed immediately. This allows multiple Non-Synchronization DVMs to be outstanding.

Having a separate threshold for the number of outstanding snoop messages of each sub-category effectively reserves one (or more) entries for an outstanding synchronisation snoop message, helping to prevent syncs from being starved out in the arbitration process.

In some embodiments, the arbitration logic comprising at least one stage (optionally a second stage, i.e. including also the stage described above) at which snoop messages belonging to the two different sub-categories are arbitrated independently (e.g. an optionally where this is done for each category of snoop-message). For example, the arbitration logic may comprise a first stage, in which for each category, the two-sub categories are each arbitrated independently, and then a separate stage in which for each category the selected snoop of each sub-category are arbitrated against each other to select a snoop message. The arbitration logic may comprise a further (e.g. third) stage in which the categories of snoop message (e.g. the ones selected by the two stages described above) are arbitrated against each other to select a snoop message for transmission.

The integrated circuit data processing system is communicatively connected to a second integrated circuit, in the described manner, although it will be appreciated that this second integrated circuit does not form a part of the (claimed) integrated circuit data processing system (i.e. since they are separate integrated circuits). The invention extends to a network including both such integrated circuits. Thus, there is further provided a data processing network, comprising the integrated circuit data processing system as described herein above (providing a first integrated circuit data processing system) and further comprising the second integrated circuit, the second integrated circuit comprising a second-chip-to-chip gateway operatively coupled to a DVM node of the second integrated circuit, the first-chip-to-chip gateway communicatively coupled to the first-chip-to-chip gateway.

In some embodiments, the second DVM node is configured, in response to receiving a snoop message belonging to the first category of snoop message, to send the third category of snoop message to a DVM node of the second integrated circuit, via the first chip-to-chip gateway and the second chip-to-chip gateway; and the first chip-to-chip gateway is configured, upon receipt of the snoop message from the second integrated circuit via the second-chip-to-chip gateway, to send a DVM message to the second DVM node.

According to the second aspect of the present invention, there are certain DVM nodes of a hub data processing network which are arranged to treat certain chip-to-chip gateways, which connect to branch integrated circuit data processing system, as though they are local nodes within the domain of the DVM node (i.e. rather than remote). The gateways are treated as local with respect to DVM messages, meaning that the DVM nodes treats requests received from the gateways as though they are received from a local request node, and transmits snoop messages to them as though they are a local request node (e.g. as snoop messages of the second category as described above), i.e. they are treated as local in relation to the receiving of DVM messages from them and the sending of snoop messages to them. Thus, requests from the gateway(s) may give rise to snoop messages of the first, second and third categories, and snoop messages of the second category (i.e. only) may be transmitted to the gateway(s), as described further below. This helps to address an issue arising in network layouts having branches i.e. in which certain branch circuits are connected only via the hub (which may be referred to as hub-and-spoke), wherein in the absence of this feature DVM messages passing from a branch circuit into the hub circuit may not fully propagate throughout the network. The hub data processing network may be considered as a central (e.g. core, base) data processing network.

Designating certain gateways to be treated as local within their domain, rather than as handling remote requests and snoops, effectively creates a second level of hierarchy for snoop messages which are handled in the respective branch circuits. Thus effectively the hub may be considered as a first level, and the two branch circuits as being at another level in the hierarchy of DVM messages, providing the improved functionality of a given DVM message handling scheme, e.g. the one described above, but without the need to duplicate an entire separate set of DVM message and snoop message categories. Thus the same functionality is achieved, with minimal modification to an existing system and with very little complication.

The invention according to the second aspect extends to a method for managing distributed virtual memory in a data processing network having a hub data processing network, a first branch integrated-circuit data processing system and a second branch integrated-circuit data processing system, the branch integrated circuit data processing systems connected only through the hub data processing network the hub data processing network comprising: a plurality of request nodes, each request node including a local memory, the local memories of the plurality of request nodes accessible as a distributed virtual memory (DVM), the method comprising:

- assigning a plurality of DVM domains, each DVM domain including a DVM node of the plurality of DVM nodes and one or more request nodes of the plurality of request nodes;
- receiving by a first hub chip-to-chip gateway of the hub data processing network a snoop message from a first-branch-circuit chip-to-chip gateway of the first branch integrated circuit;
- sending, by the first hub chip-to-chip gateway, responsive to the snoop message, a DVM message to a DVM node of the DVM domain of the first hub chip-to-chip gateway, and the DVM node treating the received DVM message as a DVM message received from a request node within the DVM domain;
- sending by the DVM node a snoop message to the first hub chip-to-chip gateway, as though the first hub chip-to-chip gateway is a request node within the DVM domain; and
- receiving by a second hub chip-to-chip gateway of the hub data processing network a snoop message from a second-branch-circuit chip-to-chip gateway of the second branch integrated circuit;
- sending, by the second hub chip-to-chip gateway, responsive to the snoop message, a DVM message to a DVM node of the DVM domain of the second hub chip-to-chip gateway, and the DVM node treating the received DVM message as a DVM message received from a request node within the DVM domain;
- sending by the DVM node a snoop message to the second hub chip-to-chip gateway, as though the second hub chip-to-chip gateway is a request node within the DVM domain.

The first branch integrated-circuit data processing system and/or the second branch integrated-circuit data processing system may also comprise any or all of: a plurality of request nodes, a plurality of DVM nodes, assignment logic, and an interconnect system, having the features described in relation to the hub data processing network.

The first branch integrated circuit data processing system and the second branch integrated circuit data processing system are connected only through the hub data processing network. By this it will be understood that there is at least one route from one branch circuit to the other branch circuit via the hub data processing network, and that all routes from one to the other pass through the hub data processing network (i.e. through another circuit), with no direct connection between the two branches.

In some embodiments, the DVM node of the first DVM domain is configured, responsive to receipt of a DVM message from the first hub chip-to-chip gateway, to send a first category of snoop message to one or more peer DVM nodes in DVM domains other than the first DVM domain and to send a second category of snoop message to request nodes, other than the first hub chip-to-chip gateway, in the first DVM domain. Thus, a DVM message (i.e. request) from the first hub chip-to-chip gateway gives rise to local snoop messages within its own domain and peer-local snoop messages (which may in turn give rise to local and remote snoop messages as described above). This may likewise occur correspondingly for the second hub chip-to-chip gateway.

In some embodiments, the first DVM domain further comprises a second chip-to-chip gateway, connected to a third branch integrated-circuit data processing system (i.e. an integrated circuit other than the first branch), wherein the DVM node of the first DVM domain is configured, responsive to receipt of a DVM message from the first hub chip-to-chip gateway, to send a third category (i.e. remote) of snoop message to the second chip-to-chip gateway. Thus, a DVM message (i.e. request) from the first hub chip-to-chip gateway gives rise to remote snoop messages, as is usually the case for a local requestor. This may likewise occur correspondingly for the second hub chip-to-chip gateway. Alternatively, or in addition, the DVM node may send a second category of snoop message to the second chip-to-chip gateway of the first domain, i.e. where that second chip-to-chip gateway is also to be treated as a local node. This may likewise occur correspondingly for the second hub chip-to-chip gateway.

In some embodiments, the first DVM node is configured, responsive to receipt of a DVM message from a request node in the domain of the first DVM node, to send a second category of snoop message (i.e. local) to the first hub chip-to-chip gateway. Thus the DVM node sends (i.e. outputs) snoops to the first hub chip-to-chip gateway as though it were a local node. This may likewise occur correspondingly for the second hub chip-to-chip gateway.

The first hub chip-to-chip gateway, responsive to receipt of this second category of snoop message, may pass this snoop message to the first-branch-circuit chip-to-chip gateway. Responsive to this snoop message, the first-branch-circuit chip-to-chip gateway may issue a DVM message (e.g. request) to a DVM node in the DVM domain of the first-branch-circuit chip-to-chip gateway. The DVM node of the branch circuit may be configured to treat the received DVM message as though it is received from a remote requestor (i.e. in the manner described above in relation to the first aspect) or from a local requestor (i.e. with the overridden behaviour described herein), depending on how the DVM node of the branch circuit is configured.

Thus, in some embodiments the DVM node of the DVM domain of the first-branch-circuit chip-to-chip gateway is configured to treat the first branch-circuit chip-to-chip gateway, with respect to DVM messages received from the first branch-circuit chip-to-chip gateway requesting a DVM operation, and snoop messages sent to the first branch-circuit chip-to-chip gateway by the DVM node, as a remote request node. This may be particularly advantageous where the first branch integrated-circuit data processing system is not connected to any further integrated-circuit data processing systems (i.e. other than the hub data processing network). Alternatively, in other embodiments the DVM node of the DVM domain of the first-branch-circuit chip-to-chip gateway is configured to treat the first branch-circuit chip-to-chip gateway, with respect to DVM messages received from the first branch-circuit chip-to-chip gateway requesting a DVM operation, and snoop messages sent to the first branch-circuit chip-to-chip gateway by the DVM node, as a local request node (e.g. with the behaviours described above in relation to the DVM node of the hub network). This may be particularly advantageous where the first branch integrated-circuit data processing system is connected to one or more further (i.e. secondary-branch) integrated-circuit data processing systems (i.e. itself acting as a hub between the main hub data processing network and the secondary branch). Treating the branch circuit CCG as local may help to ensure full propagation of DVM messages in such an arrangement, The same feature may correspondingly be present in the second branch circuit.

It will be appreciated that the first aspect and second aspect may be combined, such that DVM nodes of the data processing network of the second aspect may have the behaviours described according to the first aspect (other than for certain particular gateways which as described are treated as local requestors rather than remote), or correspondingly, the data processing network according to the second aspect may comprise an integrated circuit data processing system as described according to the first aspect (e.g. some of its nodes may behave according to the behaviours described in the first aspect). Thus, in some embodiments, the hub data processing network and/or the first branch integrated-circuit data processing system and/or the second branch integrated-circuit data processing system comprise an integrated circuit data processing system according to the first aspect (e.g. as recited in claim 1 and optionally further comprising any of the additional features described above). Thus nodes of the data processing network according to the second aspect may have the first and fourth category (i.e. peer-local and peer-remote) functionality described above with respect to the first aspect.

Thus, there is further provided a data processing network, comprising:

- a hub data processing network comprising the integrated circuit data processing system as claimed in claim 1;
- a first branch integrated-circuit data processing system; and
- a second branch integrated-circuit data processing system;
- wherein the first branch integrated circuit data processing system is connected to a (first) DVM domain of the hub data processing network through a first-branch-circuit chip-to-chip gateway of the first branch integrated circuit and a first hub chip-to-chip gateway of the hub data processing network;
- wherein the second branch integrated circuit data processing system is connected to a (second) DVM domain of the hub data processing network through a second-branch-circuit chip-to-chip gateway of the second branch integrated circuit and a second hub chip-to-chip gateway of the hub data processing network;
- wherein the first branch integrated circuit data processing system and the second branch integrated circuit data processing system are connected only through the hub data processing network;
- wherein the DVM node of the first DVM domain is configured to treat the first hub chip-to-chip gateway, with respect to DVM messages received from the first hub chip-to-chip gateway requesting a DVM operation, and snoop messages sent to the first hub chip-to-chip gateway by the DVM node, as a request node within the first DVM domain; and wherein the DVM node of the second DVM domain is configured to treat the second hub chip-to-chip gateway, with respect to DVM messages received from the second hub chip-to-chip gateway requesting a DVM operation, and snoop messages sent to the second hub chip-to-chip gateway by the DVM node, as a request node within the second DVM domain.

The first DVM domain or the second DVM domain of the second aspect may be provided by the first-request-node DVM domain of the first aspect, or by the DVM domain of the second DVM node (although it will be understood that the first chip-to-chip gateway of the first aspect will be different gateway to the first (or second) hub chip-to-chip gateway, since the first (or second) hub chip-to-chip gateway exhibits the override behaviour of being treated as local which is not the case for the chip-to-chip gateway described according to the first aspect. Alternatively, the network (e.g. hub and/or branch) may comprise a further DVM domain providing the first-request-node DVM domain of the first aspect.

Thus, in some embodiments, the hub data processing network (and/or the first branch integrated-circuit data processing system and/or the second branch integrated-circuit data processing system) comprises an integrated-circuit data processing apparatus, comprising a chip-to-chip gateway, and a DVM node within the DVM domain of the integrated-circuit chip-to-chip gateway. In some embodiments a first request node in the DVM domain of the integrated-circuit chip-to-chip gateway is configured to send a DVM message to the DVM node, and the DVM node is configured, in response, to send a first category of snoop message to one or more peer DVM nodes in DVM domains other than the DVM domain of the integrated-circuit chip-to-chip gateway. In some embodiments, a second DVM node, of the one or more peer DVM nodes, is configured, in response to receiving a snoop message belonging to the first category of snoop message, to send a second category of snoop message to request nodes within the domain of the second DVM node and send a third category of snoop message to a DVM node of a second integrated circuit, wherein the integrated-circuit chip-to-chip gateway is operatively coupled to the second DVM node and wherein the snoop message is sent via the integrated-circuit chip-to-chip gateway. In some embodiments, the integrated-circuit chip-to-chip gateway is configured, upon receipt of a snoop message from the second integrated circuit, to send a DVM message to the second DVM node, and the second DVM node is configured, in response, to send a fourth category of snoop message to one or more peer DVM nodes in DVM domains other than the DVM domain of the second DVM node. In some embodiments, a peer DVM node, in response to receiving a snoop message belonging to the fourth category, is configured to send a second category of snoop message to request nodes within the domain of the peer DVM node.

In some embodiments, the data processing network further comprises a third branch integrated-circuit data processing system, comprising a third-branch-circuit chip-to-chip gateway, and the first DVM domain (and/or the second DVM domain) comprises a secondary chip-to-chip gateway, wherein the third branch integrated circuit data processing system is connected to the first DVM domain through the third-branch-circuit chip-to-chip gateway and the secondary chip-to-chip gateway of the hub data processing network, and wherein the DVM node of the first (second) DVM domain is configured to treat the secondary chip-to-chip gateway, with respect to DVM messages received from the secondary chip-to-chip gateway requesting a DVM operation, and snoop messages sent to the secondary chip-to-chip gateway by the DVM node, as a request node within the first (second) DVM domain. Thus a DVM domain may comprise more than one chip-to-chip gateway which is treated as local in the described manner (i.e. which is overridden to be treated as local rather than remote), as well as optionally comprising one or more behaving as described above in relation to the first aspect.

It will be appreciated that this principle may also be extended to the branch integrated-circuit data processing systems, which may comprise such (i.e. "overridden") CCGs in connection to the hub network as described, and/or in connection with one or more further branches, e.g. other integrated circuits which are connected to the branch circuit (and optionally only via the respective branch), thus creating a further level of hierarchy. The data processing network may comprises a plurality of branches (i.e. at least the two described). In some embodiments, each branch circuit (i.e. all) may be connected to the hub (or their respective hub) via an overridden CCG as described. This helps to ensure full connectivity.

The referenced hub data processing network may consist of just one integrated circuit (e.g. the first integrated circuit data processing system of the first aspect as described above), so that the referenced DVM domains are part of the same integrated circuit (although other hub data processing networks may also be present in the network), or the hub may comprise multiple integrated circuits, and the DVM domains may be within different integrated circuits.

Thus, in some embodiments, the hub data processing network comprises an integrated circuit data processing system, and wherein the integrated circuit data processing system comprises the first DVM domain, the first integrated-circuit chip-to-chip gateway, the second DVM domain and the second-branch-circuit chip-to-chip gateway.

In some embodiments, the hub data processing network comprises a first integrated circuit data processing system and a second integrated circuit data processing system. In some embodiments, the first integrated circuit data processing system comprises the first DVM domain and the first integrated-circuit chip-to-chip gateway, and the second integrated circuit data processing system comprises the second DVM domain and the second-branch-circuit chip-to-chip gateway.

Concepts described herein may be embodied in computer-readable code for fabrication of an apparatus that embodies the described concepts. Thus, according to a third aspect of the present invention, there is provided a non-transitory computer-readable medium storing computer-readable code for fabrication of the integrated circuit data processing system according to the first aspect of the present invention or of the data processing network according to the second aspect of the present invention. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL.

Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Features of any aspect or embodiment described herein may, wherever appropriate, be applied to any other aspect or embodiment described herein. Where reference is made to different embodiments or sets of embodiments, it should be understood that these are not necessarily distinct but may overlap. It will furthermore be understood that references made to a method comprising a step correspondingly extend to a data processing apparatus, or integrated circuit data processing system "configured to" carry out a step, and vice versa.

FIG. 1 is a schematic illustration of an integrated circuit data processing system 201 for processing requests. The integrated circuit data processing system 201 includes a plurality of nodes, described in further detail below, some of which may provide DVM nodes which may behave as claimed according to either aspect. Thus, the integrated circuit data processing system 201 of FIG. 1 may embody the integrated circuit data processing system of claim 1 and may provide the hub and/or branch circuits of the data processing network of claim 11.

The nodes are coupled together by an interconnect 202, thus forming a connection between the functional blocks which the nodes provide. The interconnect 202 provides signal connections between the nodes and may have various topologies. For example, the interconnect 202 may be configured to form a mesh network, a ring network, a cross-bar network, or other network. The interconnect may provide a number of cross-points (XPs) 204*a*-204*h*. Each cross-point 204*a*-204*h* provides one more device ports for coupling to nodes (e.g. to request nodes and home nodes as described below) and one or more interconnect ports which couple to other cross-points. Where the interconnect 202 forms a mesh network, the integrated circuit data processing system 201 may be referred to as a (coherent) mesh network 201.

Transmissions throughout the interconnect 202 are able to be sent on four channels provided by the interconnect 202—these are referred to as a Request Channel (REQ), a Response Channel (RESP), a Data Channel (DAT), and a Snoop Channel (SNP). Each of these (or only some, e.g. RESP and DAT) may be duplicated in order to provide separate channels for transmit (TX) and receive (RX). The REQ channel is used for sending read and write requests, cache maintenance requests, and DVM requests. The RESP channel is used to send completion responses for various types of messages, ranging from write and cache management responses to data-less snoop responses and operation completion acknowledgments. The SNP channel issues snoops and sends DVM operations. The DAT channel is used to send write and read data, and snoop responses which include data.

All protocol messages are sent in the form of a Flit. Flits are a packetized collection of control fields and identifiers that communicate a protocol message.

Some of the control fields sent in a Flit include opcodes, memory attributes, address, data, and error responses. Each channel needs different Flit control fields. For example, a Flit to read or write on the Request channel needs an Address field, and a Flit on the Data channel needs the Data and Byte Enable fields. The fields in a Flit may be sent in parallel (i.e. not serialized over multiple packets).

Chip-to-chip gateways (CCGs) couple between the network on one chip (i.e. one integrated circuit data processing system 201) and a network on another chip (i.e. a second integrated circuit data processing system 201'). This enables formation of a network spanning multiple chips. Two example chip-to-chip gateways 206, 206' belonging respectively to the first and second integrated circuit data processing systems 201, 201' are shown in FIG. 1, coupling an XP 204*d* of the first integrated circuit data processing system 1 to an XP 204*a'* of a second integrated circuit data processing system 201'. Only a small part of the second integrated circuit data processing system 201' is shown, as illustrated by the use of dashed lines out from the XP 204*a'*.

In this example, CCG nodes 206, 206' include both a request agent (RA), for issuing requests and receiving snoops, and a home agent (HA), for receiving requests and issuing snoops.

There are three categories of node which may be present in the integrated circuit data processing system 201—these are Request Nodes (RNs), Home Nodes (HNs) and subordinate nodes (SNs). Each of these is described further below.

The role of request nodes is to generate transactions, such as read and write requests, in order to access and process data. These transactions are sent to Home Nodes (HNs).

There are several different varieties of request node, each of which is described by a corresponding term—a Fully Coherent Request Node (RNF), an input/output (1/O) Coherent Request Node (RNI), and an I/O Coherent RN with Distributed Virtual Memory (DVM) support (RND). A request node may be, for example, a central processing unit (CPU) core, a neural engine or other accelerator, or a Component Aggregation Layer that houses two or more CPU cores to be connected to one network port.

A Fully Coherent Request Node (RNF) contains coherent caches and will accept and respond to snoop messages for accessing or changing the coherency state of cached data. It will be understood that coherency refers to ensuring that all processors in the system see the same view of memory, meaning that changes to data held in the cache of one core are visible to the other cores, making it impossible for cores to see stale copies of data (the old data from before it was changed by the first core).

An I/O-Coherent Request Node (RNI) does not have a coherent cache, and cannot accept snoop messages. An I/O-Coherent Request Node with DVM support (RND) has the same functionality as an RNI and can also accept DVM messages. Example RNFs 208*a*-208*d*, 208*a*', RNIs 210*a*, 210*b*, and RNDs 212*a*, 212*b*, are illustrated in the integrated circuit data processing system 201 of FIG. 1. As illustrated, the RNIs are connected to one or more IO devices 214*a*, 214*b*. Although not illustrated, it will be understood that the RNDs 212*a*, 212*b*, may also be connected to one or more 10 devices.

Home Nodes (HNs) receive transactions from Request Nodes (RNs), and are responsible for ordering these requests, generating transactions to SNs (discussed below) and in some cases issuing snoops and handling DVM operations.

There are two main types of home node—fully coherent Home Nodes (HNFs), which order all requests to coherent memory and issue snoops to RN-Fs, and non-coherent Home Nodes (HNIs) which order requests that target an I/O subsystem. Both types act as a point of serialization.

The integrated circuit data processing system 201 includes a system level cache (SLC) which may reduce the number of accesses to memory and reduce the latency of data accesses. The system level cache may be distributed across a large set of home nodes in a network to share the cache capacity over all network nodes across multiple chips, in particular across the fully coherent home nodes (HNFs). The portion of a system level cache (SLC) present at a particular HNF may be referred to as a system cache group (SCG). A fully coherent home node (HNF) provides a point of coherency for a subset of system addresses and provides a cache for storing data associated with the addresses. Coherency may be provided by a snoop filter (SF) that tracks data copied to caches in the network caches. HNFs may thus comprise a system cache group (part of the system level cache) and a snoop filter. Thus, HNFs control coherency among data stored by the data processing system. Two example HNFs 216*a*, 216*b* are shown in FIG. 1. FIG. 1 also shown an example HNI 218, which is coupled to one or more I/O resources 220.

There are then further types of home node which are variations of the HNIs which have additional functionality compared to an HNI—these include HNVs, HNTs, and HNDs. An HNV is an HNI which further includes a distributed virtual memory (DVM) node. An HNT is an HN-I further including the functionality of both a DVM node and also a Debug Trace Controller (DTC). An HN-D is HN-I further including the functionality of a DVM node, a DTC, and a configuration subordinate (which is a subordinate interface for configuration register space access). FIG. 1 shows an example of each of an HNV 220, HNT 222 and HND 224.

A distributed virtual memory (DVM) node, also referred to as a DN, controls its own respective DVM domain, such that each RNF sends its DVM requests to the DN in its own domain. DVM requests are messages which request a DVM operation in order to support maintenance of the virtual memory system. The DN propagates snoops and receives corresponding responses, based on the received DVM request. The DVM node receives a DVM message from a request node, completes the requested action, and returns a response to the originating request node. As described above, DVM nodes may be present within various different types of node, meaning that these various types of node are capable of providing a DVM node. The present inventions relate to advantageous behaviours of the DVM nodes (e.g. in terms of the messages exchanged between them), as is explained further below.

Subordinate nodes (SNs) provide access to data sources and sinks, such as memory and peripheral devices. A memory or peripheral device may be located off-chip or on-chip (i.e. as part of the integrated circuit data processing system 201, or separate from it).

There are two types of subordinate node—fully coherent subordinate nodes (SNFs) which connect to memory devices that back the coherent memory space, and non-coherent subordinate nodes (SNIs) which connect to I/O peripherals or non-coherent memory. FIG. 1 shows an example SNF 226, connected to a memory controller 228, and it shows an example SNI 230, which as explained may be connected to non-coherent memory or an I/O peripheral (not shown).

Every component in the system is assigned a Unique Node ID. The system may then use a System Address Map (SAM) to convert physical addresses to a Node ID.

To be able to determine the target Node ID of outgoing requests, each RN and HN has a corresponding system address map.

The operation of the integrated circuit data processing system 201 can be considered with respect to several different layers of operation—these include the physical layer, the link layer and the protocol layer.

The physical layer refers to the physical configuration of components and the physical data links between them, over which raw data may be transmitted between network nodes.

The link layer provides link initialization, flow-control, and link deactivation functionality. Link initialization refers to a mechanism by which the receiving device communicates link layer credits, on each channel that is present, to a transmitting device. Flow control refers to a mechanism by which the transmitting device uses link layer credits to send flits between network devices. The transmitting device uses one credit per flit. The receiving device sends these credits back to the transmitting device, one at a time, after processing each flit. Subsequent flit transfers can then occur. The link deactivation mechanism is achieved by the transmitting device sending all unused link layer credits on each channel back to the receiving device by sending corresponding link flits. The link layer thereby manages link channels to provide deadlock free switching across the network.

The protocol layer generates and processes requests and responses at the protocol nodes, defines the permitted cache state transitions at the protocol nodes that include caches, defines the transaction flow for each request type, and manages protocol level flow control.

Link layer properties refer to properties related to the transmission of a particular flit or request (i.e. its travel path through the interconnect system), whereas protocol properties refer to properties of the request itself, i.e. of the payload of the request.

It is known to categorise DVM management messages (e.g. requests and snoops) into several different types based on their source and target. A known arrangement for this is illustrated in FIG. 2.

Figure 2:
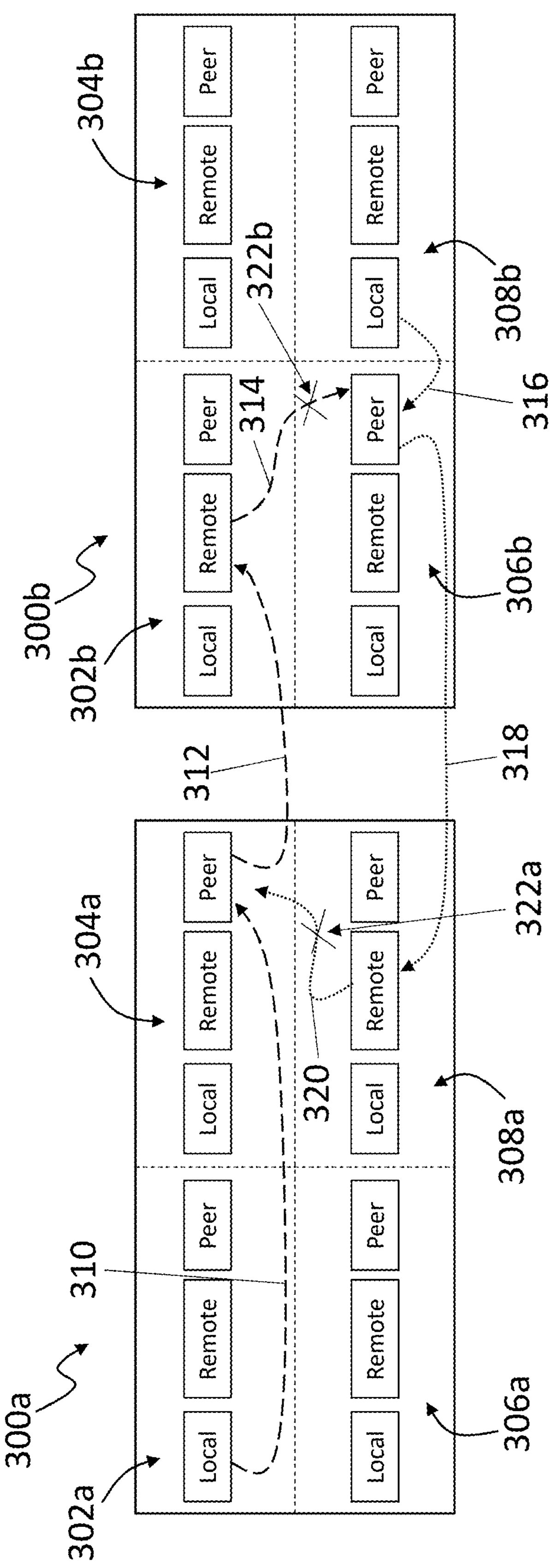
FIG. 2 is a schematic diagram representing the flow of DVM snoop messages between DVM nodes according to the prior art.

FIG. 2 shows, schematically, a first integrated circuit data processing system (i.e. chip) 300*a* and a second integrated circuit data processing system 300*b*. Each is divided into four separate DVM domains 302*a*-308*a*, 302*b*-308*b* each of which is managed by a respective DVM node.

A first series of DVM messages is initiated by receipt of a local request by the DVM node in the top-left DVM domain 302*a* of the first chip 300*a*. This triggers a peer snoop message to be sent to the other DVM nodes 304*a*, 306*a*, 308*a* of the same chip, as illustrated by a dashed arrow 310 in the case of the top-right DVM domain 304*a*.

This is then sent from this DVM node to the top-left DVM domain 302*b* of the second chip 300*b* (via a CCG) as a remote request, as illustrated by arrow 312. In response, the DVM node of this domain sends snoops on to its peer DVM nodes (i.e. the other domains on the same chip), one example of which is shown by another dashed arrow 314.

A series of dotted arrows 316, 318, 320 shows a similar series of DVM messages, in this case initiated by a local request received by the DVM node of the bottom-right DVM domain 308*b* of the second chip 300*b*, and passing as a peer request to bottom-left DVM domain 306*b*, remote in the bottom-right domain 308*a* of the first chip 300*a* and peer in the top-right domain 304*a* of the first chip 300*a*.

It can be seen that this categorisation scheme results in many snoops being issued in the “peer” category, those caused by local requests made in peer DVM domains, and those generated by peer DVM nodes in response to them receiving remote requests. This can effectively result in points of obstruction 322*a*, 322*b*, as illustrated by the crosses shown in FIG. 2, illustrating cases where the snoop message indicated by the arrow may not be accepted into the indicated DVM node tracker or buffer since it may already be occupied by other requests (e.g. those illustrated by the other arrows). In the illustrated scenario the two series of snoops have formed a deadlock situation, since the first set, with dashed arrows, can’t complete (and therefore clear the DVM node buffers) until the final step into domain 306*b* is completed, but that can’t take place until the series of requests with dotted lines is completed and clears the buffer, and the series of snoops shown by dotted lines can’t complete without the dashed requests clearing the “peer” buffer of the top-right domain 304*a* of the first chip 300*a*.

According to the present invention, the two types of peer request, those resulting from local requests made in peer DVM domains, and those originating from remote requests to peer DVM nodes, are distinguished by having two different categories of snoop message—peer-local and peer-remote, which are handled and tracked separately. It has been appreciated that this may help to avoid deadlock situations like that illustrated in FIG. 2, and that looping situations in which snoop messages cannot properly complete in some layouts because of being repeatedly circulated may also be avoided.

Figure 3:
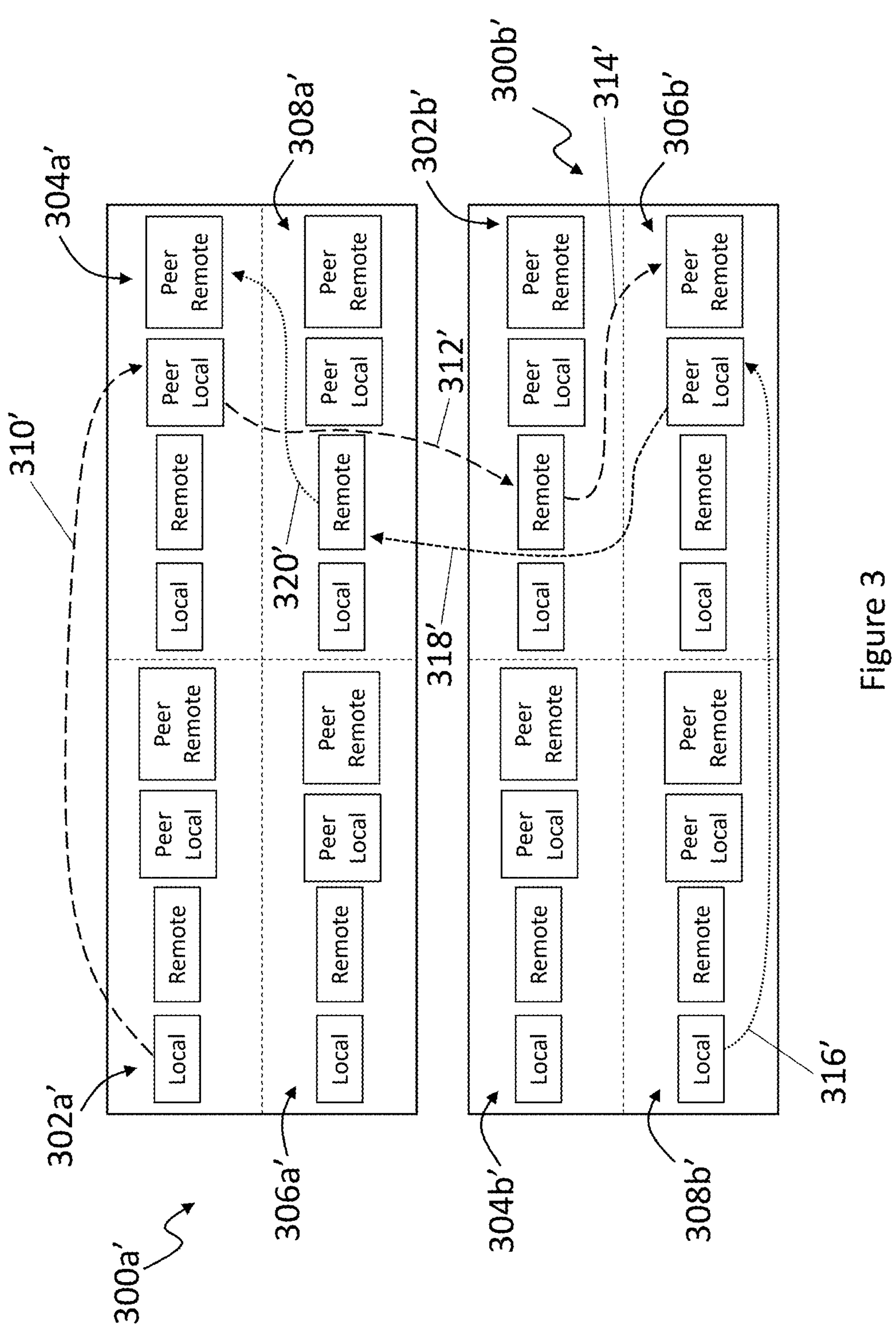
FIG. 3 is a schematic diagram representing the flow of DVM snoop messages between DVM nodes according to an embodiment of the first aspect of the present invention.

To illustrate this advantage, FIG. 3 illustrates an equivalent arrangement and series of DVM snoops as in FIG. 2, but in this case illustrates the two separate categories of peer DVM management message. It is noted that in FIG. 3 the two chips 300*a*', 300*b*' are illustrated one above the other and the second chip 300*b*' is mirrored compared to its illustration in FIG. 2, for clarity. Thus, each DVM node now includes four trackers, one each for each of the categories of DVM message, as discussed further below. As seen, the previous deadlock scenario is avoided. For ease of reference, the same reference numerals as used in FIG. 2 are now used in FIG. 3, but with each now followed by an apostrophe.

Figure 4:
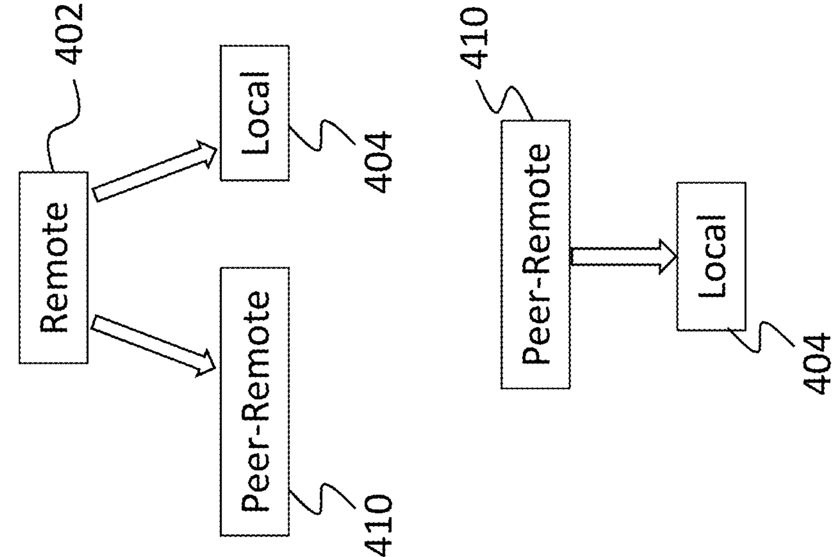
FIG. 4 is a diagram representing the categories of snoop messages generated by various types of DVM message and snoop message according to the present invention.
Figure 4:
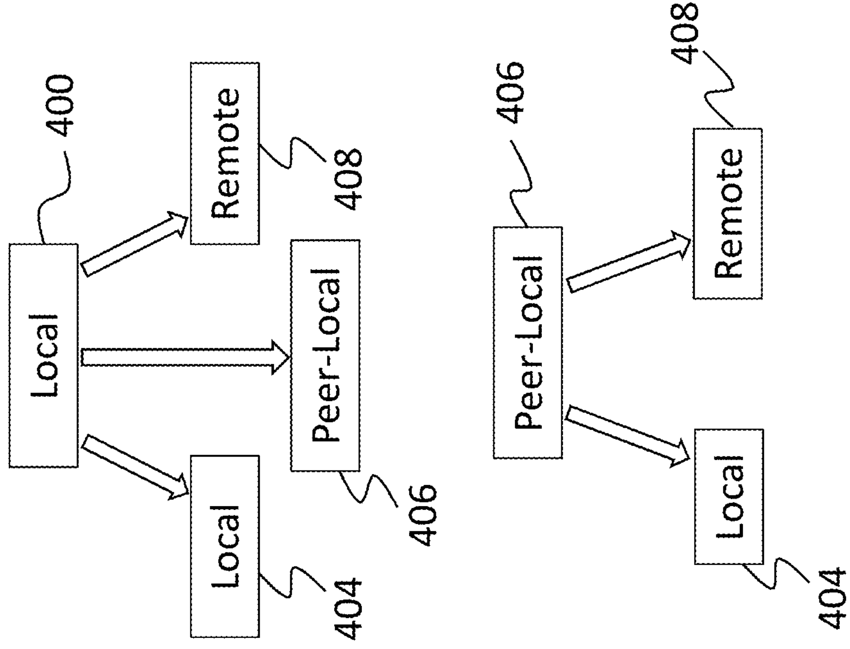

FIG. 4 represents the categories of snoop messages generated by various types of DVM message and snoop messages. The top two arrangements show the snoop messages which are triggered by DVM requests, i.e. from requestors.

The two possible types of DVM message (i.e. request) are a local request 400 and a remote request 402. A local request 400 is generated by a request node to a DVM node in its own DVM domain. A remote request 402 is generated by a chip-to-chip gateway, to a DVM node in its own DVM domain, based on a snoop message which is received from a remote gateway to which the chip-to-chip gateway is connected. It therefore begins as a snoop message, and becomes a request, and it may therefore also be referred to as a snoop-to-request.

As shown in the top-left section of FIG. 4, in response to receipt of a local request 400, a DVM node issues (as appropriate, i.e. depending on the devices in its domain and its integrated circuit), local snoops 404 (i.e. to request nodes within its own domain other than the requesting node which issued the DVM request), peer-local snoops 406, to other DVM nodes within the same chip, and remote snoops 408, to any chip-to-chip gateways (CCGs) to which the DVM is connected and which are designated as remote.

In response to receipt of a remote request 402, a DVM node issues local snoops 404, and also issues peer-remote snoops 410, which are sent to other DVM nodes within the same chip as the particular DVM node.

The lower part of FIG. 4 shows which categories of snoop message a DVM node generates in response to receiving a snoop message of these two categories—peer-local and peer-remote.

As shown in the bottom-left section of FIG. 4, in response to receipt of a peer-local snoop message 406, a DVM node issues both local snoops 404 to any request nodes in its own domain, and issues remote snoops 408, to any CCGs in its domain (which are designated as remote).

In response to receipt of a peer-remote snoop message 410, a DVM node issues only local snoops 404, to any request nodes in its own domain, but does not issue a remote snoop, even if a remote CCG is present in the domain of that DVM node.

Figure 5:
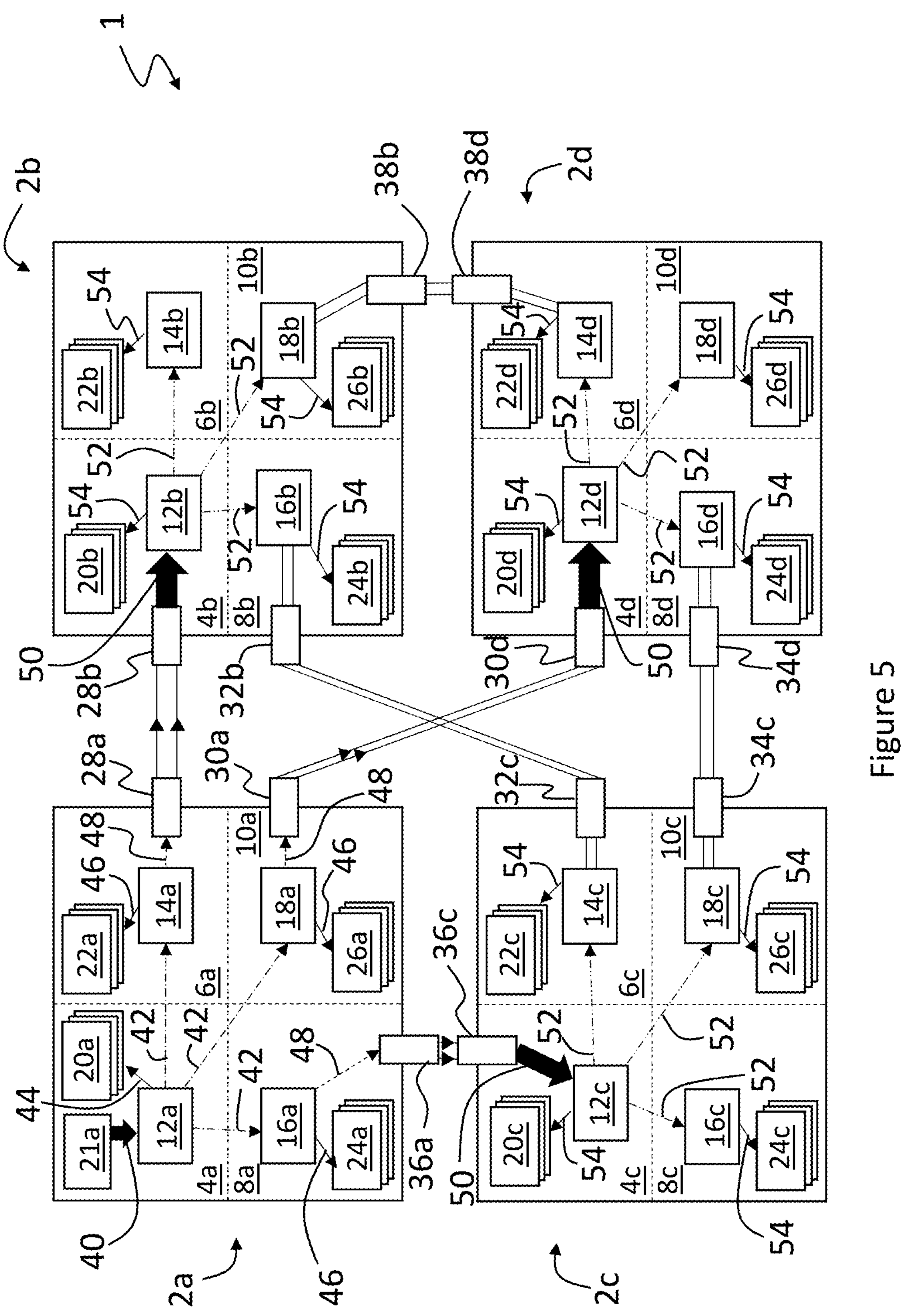
FIG. 5 is a schematic diagram illustrating the flow of snoop messages of various categories generated in response to an initial DVM message.

In order to further illustrate this process, an example data processing network 1 according to an embodiment of the invention is shown in FIG. 5, and the flow of snoop messages and requests between various components of the network in response to an initial DVM message is illustrated.

The data processing network 1 includes four integrated-circuit data processing systems 2*a*, 2*b*, 2*c*, 2*d*, each of which may comprise some or all of the components illustrated in the integrated circuit data processing system 201 of FIG. 1.

Each integrated-circuit includes a plurality of request nodes, each request node including a local memory, the local memories of the plurality of request nodes accessible as a distributed virtual memory (DVM). The request nodes are connected by an interconnect system, as shown in FIG. 1. Each integrated-circuit also includes assignment logic which assigns one or more request nodes of the plurality of request nodes to each DVM node of the plurality of DVM nodes to form a DVM domain for each DVM node.

In this example, each integrated-circuit data processing system 2*a*, 2*b*, 2*c*, 2*d*, is divided into four separate DVM domains 4*a-d*, 6*a-d*, 8*a-d*, 10*a-d* (indicated by dashed lines dividing up the chip), each of which is managed by a respective DVM node 12*a-d*, 14*a-d*, 16*a-d*, 18*a-d*. As explained, each DVM domain includes a respective plurality of request nodes 20*a-d*, 22*a-d*, 24*a-d*, 26*a-d*.

The data processing network 1 also includes several pairs of chip-to-chip gateways, where each pair is connected together to form a CCG-to-CCG link between particular domains of respective chips.

In particular, a first CCG 28*a* and a second CCG 28*b* connect a DVM domain (particularly the domain shown on the top-right) 6*a* of the first chip 2*a* to a domain 4*b* (top-left) of the second chip 2*b*. A second pair of CCGs 30*a*, 30*d* connect between other domains 10*a*, 4*d* of the first and fourth chips (bottom-right of the first chip 2*a* to top-left of the fourth chip 2*d*). A third pair of CCGs 32*b*, 32*c* connect between respective domains 8*b*, 6*c* of the second and third chips 2*b*, 2*c*. A fourth pair of CCGs 34*c*, 34*d* are connected between respective domains of the third and fourth chips 2*c*, 2*d*. A fifth pair of CCGs 36*a*, 36*c* connect between respective domains 8*a*, 4*c* of the first and third chips 2*a*, 2*c*. A sixth pair of CCGs 38*b*, 38*d* connect between respective domains 10*b*, 6*d* of the second and fourth chips 2*c*, 2*d*. Each CCG-to-CCG link is represented by double lines, with messages sent across those channels indicated with two arrow heads.

In this example, an initial DVM operation request, referred to as a DVM message, is sent by a particular request node 21*a* of the top-left (e.g. first) DVM domain 4*a* of the first chip 2*a* (i.e. one of the request nodes in that domain) to the DVM node 12*a* of that DVM domain 4*a*. This is indicated by a solid arrow 40 in FIG. 5. This is a local DVM request, since it originates from within the DVM domain 4*a* of the receiving DVM node 12*a*.

In response, the DVM node outputs (i.e. sends) a first category, of peer-local snoop message to all of its peer DVM nodes 14*a*, 16*a*, 18*a* in the same integrated-circuit, i.e. in the first chip 2*a*. These first category, peer-local snoop messages are indicated with arrows 42 which are dotted and dashed arrows, made up of single dots and dashes.

The DVM node 4*a* which received the initial local request also outputs (i.e. sends) a second category of snoop message 44, local snoop messages, to all other request nodes 20*a* in that DVM domain 4*a*, other than the request node from which the request originated. The second category, local snoop messages are indicated with solid arrows.

The peer DVM nodes 14*a*, 16*a*, 18*a* which receive the peer-local snoop messages 42 in response send local snoop messages 46 to each request node 22*a*, 24*a*, 26*a* in their respective domain.

Each of the peer DVM nodes 14*a*, 16*a*, 18*a* which receives the peer-local snoop messages 42 also has a respective CCG in its domain 28*a*, 36*a*, 30*a*. In response to the peer-local snoop message 42 which they receive, each also transmits a third category of remote snoop message 48 to their respective CCGs. These remote snoop messages are indicated by dashed arrows (i.e. dashes only, not including any dots).

These snoops are transmitted across the CCG-to-CCG links, as indicated by the two arrow heads on each, and they arrive at the respective CCGs 28*b*, 30*d*, 36*c* on the other side of each link. In response to receipt of these snoop messages, the receiving CCGs transmit a DVM message 50 to their respective DVM nodes (each indicated by a solid block arrow). In the example of FIG. 5, the CCGs are all treated as remote by their respective DVM nodes 12*b*, 12*c*, 12*d*, and therefore these DVM messages 50 are all remote DVM requests.

In response to receipt of this remote DVM request 50, each of the respective DVM nodes 12*b*, 12*c*, 12*d*, sends a fourth category of snoop message 52, referred to as a peer-remote snoop message, to all of the other peer DVM nodes in that same chip—for example in the case of the second chip 2*b*, the receiving DVM node 12*b* sends peer-remote snoop messages 52 to the other three DVM nodes 14*b*, 16*b*, 18*b*. These fourth category, peer-remote snoop messages are indicated with arrows 52 which are dotted and dashed arrows, made up of two dots between dashes.

In response to receiving the respective peer-remote snoop messages 52, each DVM node issues local snoop messages 54 to all of the request nodes in their own domain. Notably however, they do not send remote snoop messages to (remote) CCGs which are present within their domains. This helps to prevent a looped cycle from forming, by preventing a snoop message from being propagated back to a domain in which it has already been circulated since if a request were erroneously sent back to the domain it came from then it could form a loop which could never complete.

Figure 6:
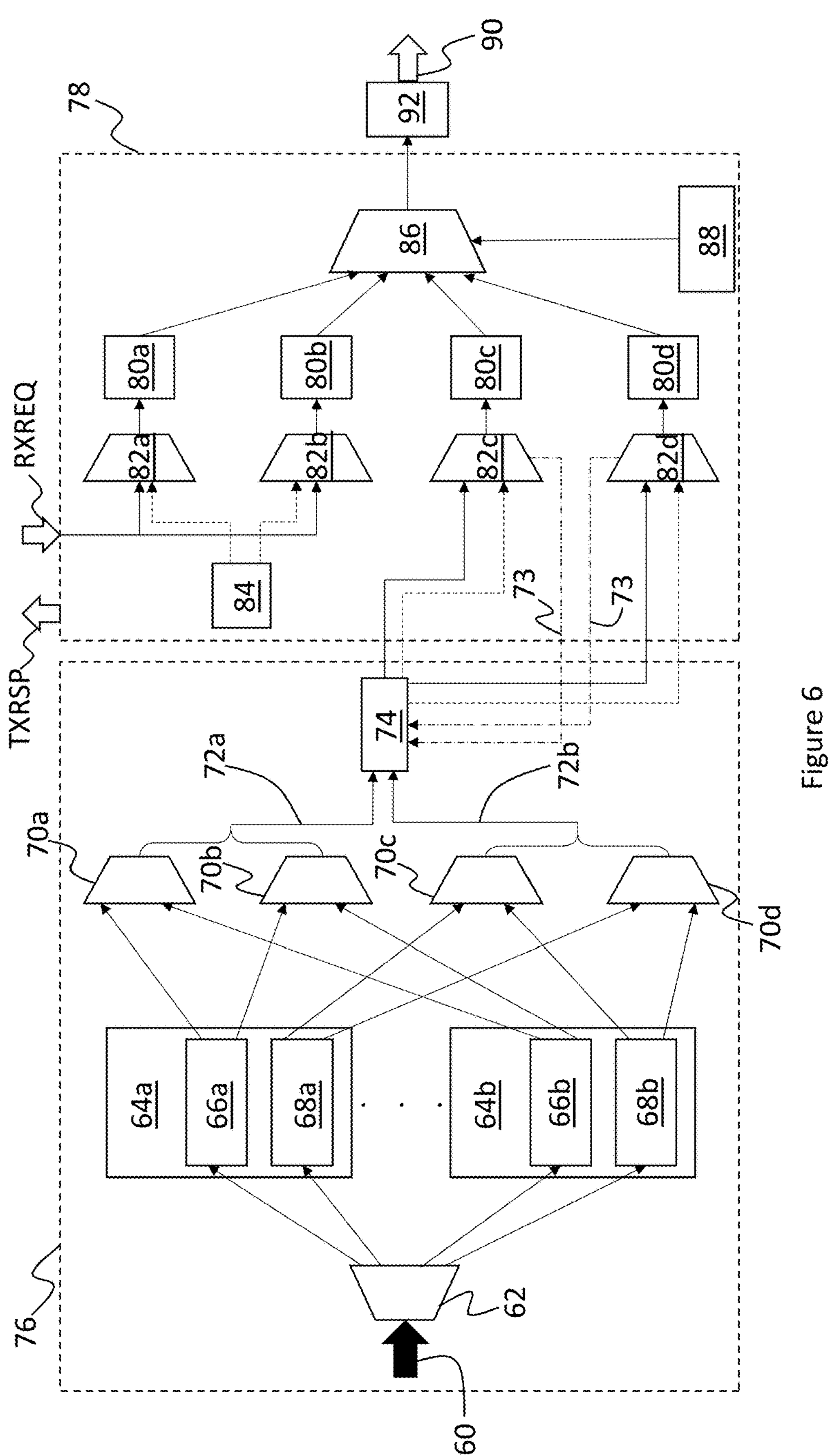
FIG. 6 is a flow diagram representing the allocation of snoop messages into the trackers of a DVM node according to the present invention.

At each DVM node, the snoop messages must be received, processed, and the associated triggered snoop messages transmitted. FIG. 6 is a flow diagram representing this process in more detail for an example DVM node (e.g. any of the DVM nodes of FIG. 5), and in particular representing the allocation of snoop messages into the trackers of the DVM node according to the present invention.

The block arrow on the left 60 of FIG. 6 indicates receipt of a particular snoop request message by the DVM node.

At a first decoding stage 62, the ID of the issuing DVM node is determined and it is determined whether the snoop message is of the type peer-local or peer-remote.

The DVM node contains a plurality of buffer groups 64*a*, 64*b*, only two of which are shown, with the presence of others indicated by the series of dots. Each buffer group 64*a*, 64*b* corresponds to a respective DVM node from which the particular illustrated DVM node shown may receive snoop messages. Each buffer group 64*a*, 64*b* contains two separate buffers within it, a first, peer-local buffer 66*a*, 66*b* for storing peer-local snoop messages which are received from the corresponding DVM node (e.g. DN0, DNn etc.), and a second, peer-remote buffer 68*a*, 68*b* for storing peer-remote snoop messages which are received from the corresponding DVM node. Based on the determination made at the first decoding stage 62, the received snoop request 60 is allocated into the appropriate buffer 66*a*, 66*b*, 68*a*, 68*b*. The number of available entries (i.e. storage elements) in each buffer is equal in this example, and sets how many snoops of a particular type a DVM node may receive from a particular other DVM node.

As explained above, each snoop message is one of two possible types—either a synchronisation message (referred to as a "sync"), or a non-synchronisation message (also referred to as an "op" message). The op and sync messages are sent to arbitrate separately, such that there are four different arbitration stages 70*a*, 70*b*, 70*c*, 70*d* (with each received snoop message of course only arbitrating at one of these stages). The stages are for peer-local op arbitration 70*a*, peer-local sync arbitration 70*b*, peer-remote op arbitration 70*c* and peer-remote sync arbitration 70*d*.

The peer-local op & sync winners 72*a* of the arbitration and the peer-remote op & sync winners 72*b* are sent to a further arbitration stage 74, which selects between non-sync and sync DVMs from peer-local and peer-remote requestors. From this stage 74, ops, indicated by solid arrows, and syncs, indicated by dashed arrows, are sent to the arbitration stages for peer-local snoops 82*c* and peer-remote snoops 82*d*, as described further below. The further arbitration stage 74 receives crediting information back from the later arbitration stages 82*c*, 82*d*, as indicated by the respective dotted-and-dashed arrows 73. This crediting information 73 indicates if there is space available in each tracker (peer-local and peer-remote) for non-sync requests and/or sync requests and/or both classes of request together.

The DVM node components described above in relation to FIG. 6 are present at the link layer 76 of the system. This is illustrated by the dashed box shown around these components.

The other dashed box 78, on the right-hand side of FIG. 6, represents a buffer of the DVM node (e.g. a protocol layer buffer). This buffer contains four separate trackers 80*a*, 80*b*, 80*c*, 80*d*, and four corresponding arbitration stages 82*a*, 82*b*, 82*c*, 82*d* at which requests or snoops arbitrate for entry into the respective trackers.

The bottom two trackers are the peer-local tracker 80*c* and the peer-remote tracker 80*d*, which receive their snoop messages from other DVM nodes through the process described above.

The top two trackers are the local tracker 80*a* for tracking local requests and the remote tracker 80*b* for tracking remote requests. These requests are received on the receive channel, labelled RXREQ. A retry module 84 also arbitrates at the local request arbitration 82*a* and the remote request arbitration 82*b*, for retrying failed requests.

Figure 7:
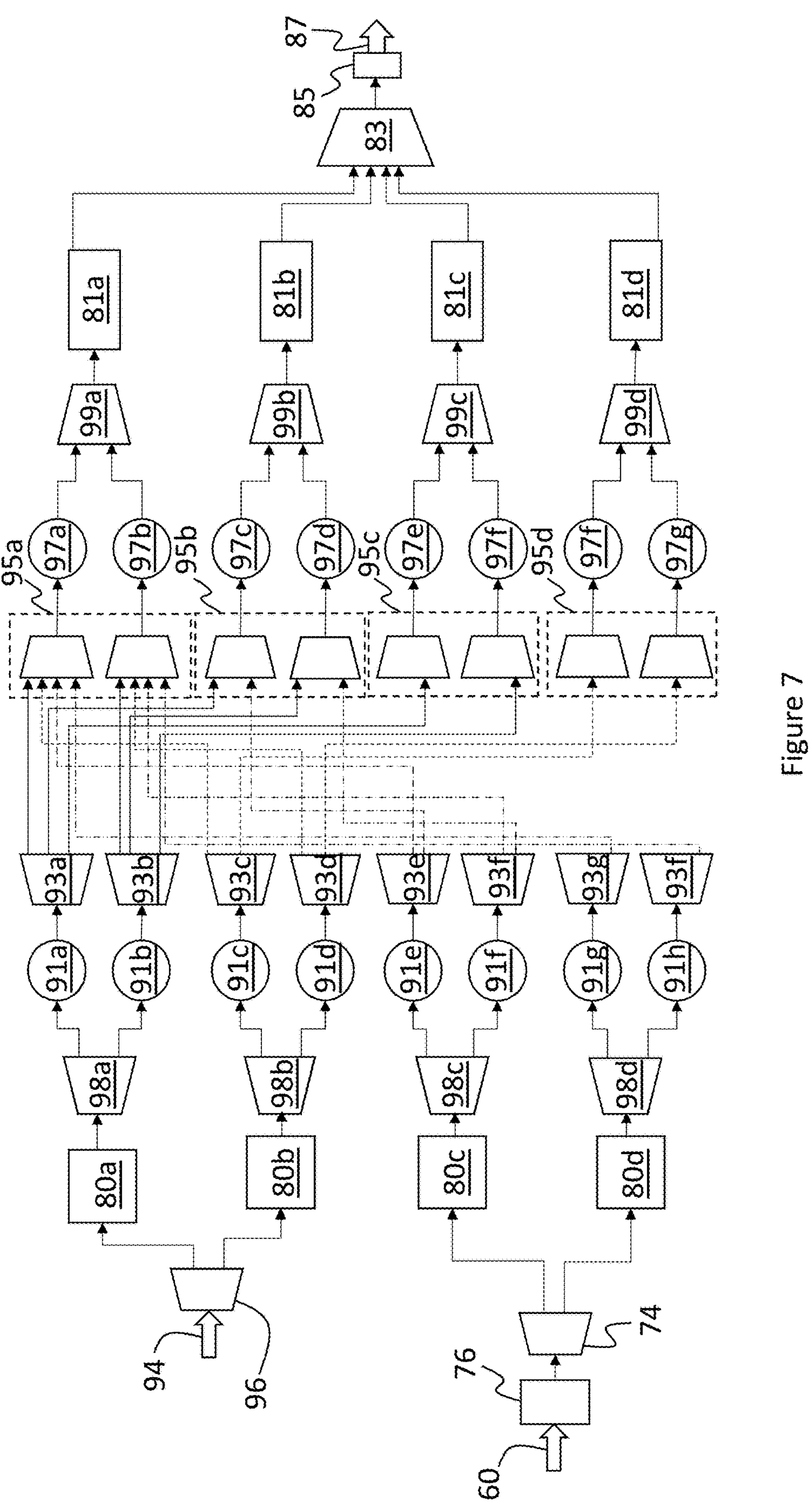
FIG. 7 is a flow diagram representing a main arbitration stage of FIG. 6.

Requests and snoops in all the trackers are then arbitrated together at a main arbitration stage 86, which is shown in more detail in FIG. 7. This arbitration stage 86 takes into account pending snoop counts representing the total number of outstanding snoops of each category, and the total number of outstanding syncs of each category, which are represented generally as input 88 to the arbitration stage 86, shown in FIG. 7.

The snoop message which wins at the main arbitration 86 is then output as a snoop message 90, by first passing through a transmission preparation stage 92 which determines, from information about the source of the request, the request type, and other details, which devices in the system the DVM message is to be sent to. The transmission preparation stage 92 forms a list of target IDs based on this information, and forms a snoop message which is then dispatched to each target via the snoop channel as indicated by the arrow 90.

FIG. 7 shows a particular request 94 being received on the request channel, and shows a stage 96 at which the source type of the request is detected, i.e. whether it is remote or local. The requests and snoops allocate into the respective trackers 80*a*, 80*b*, 80*c*, 80*d* according to the process shown in FIG. 6. They are then arbitrated for transmission of their respective triggered snoops according to the process of FIG. 7.

Entries in each tracker 80*a*, 80*b*, 80*c*, 80*d* which have a valid bit-vector are sent to a first respective determination stage 98*a*, 98*b*, 98*c*, 98*d* at which it is determined whether the snoop or request is an op or a sync, and these two types are sent on different pathways (with Ops shown in the top path, and Syncs on the respective path below).

Then, at respective checking stages 91*a*-91*h* which are indicated by circles, it is checked whether the respective DVM Ops and syncs are ready for dispatch, in order for the respective request to proceed. Then, provided that this requirement is met, at a second respective determination stage 93*a-h*, it is determined for each Op or Sync request which categories of snoop message need to be issued as a result. The resulting snoop messages are sent to four different arbitration stages—a local request arbiter 95*a*, a remote request arbiter 95*b*, a peer-local request arbiter 95*c*, and a peer-remote arbiter 95*d* (each containing two arbiters, an upper one for Ops, and a lower one for Syncs).

These arbitration stages 95*a*, 95*b*, 95*c*, 95*d* arbitrate the snoop messages to be sent to different groups of receiving devices. The first arbitration stage 95*a* arbitrates snoops to be sent to the local group of receivers, i.e. all RNFs in the domain of the DVM node. The second arbitration stage 95*b* arbitrates snoops to be sent to remote devices, and in particular any CCGs which are present in the domain of the particular DVM node shown, and which the DVM node is configured to treat as remote devices.

The snoop messages from the third and fourth arbitration stages 95*c*, 95*d* are to be sent to the group that consists of all other DVM nodes in the same chip as the DVM node shown (i.e. all peer DVM nodes).

Snoop messages resulting from the local requests (i.e. from determination stages 93*a*, for Ops, and 93*b*, for syncs), are shown with solid arrows. It can be seen that local requests give rise to local snoop messages, which go to the top arbiter for local snoops 95*a*, remote snoops, which go to the second arbiter 95*b*, and peer-local snoops, which go to the third arbiter 95*c*.

Snoop messages resulting from the remote requests, i.e. the third and fourth determination stages 93*c*, 93*d* are shown with dashed arrows. Remote requests give rise to local snoops, to the first arbiter 95*a*, and peer-remote snoops, to the fourth arbiter 95*d*.

Snoop messages resulting from the peer-local snoops, i.e. the fifth and sixth determination stages 93*e*, 93*f* are shown with arrows which are dotted and dashed arrows, made up of single dots and dashes. Peer-local requests give rise to local snoops, to the first arbiter 95*a*, and remote snoops, to the second arbiter 95*b*.

Snoop messages resulting from the peer-remote snoops, i.e. the seventh and eighth determination stages 93*g*, 93*h* are shown with arrows which are dotted and dashed arrows, made up of two dots and between dashes. Peer-remote requests give rise only to local snoops, to the first arbiter 95*a*.

As shown in FIG. 6, the arbitration of FIG. 7 takes into account threshold limits configured in the DVM node for each outstanding type of snoop (i.e. for how many of each category are allowed to be outstanding from the DVM node at a particular time).

In this example, there are separate thresholds used for Ops and Syncs, and in particular only one pending sync in each category is allowed. Therefore, there are respective checking stages for the Op messages 97*a*, 97*c*, 97*e*, 97*g* at which it is checked whether the number of outstanding snoop messages of that category is at its respective limit (or otherwise that credits are available). There are also corresponding checking stages 97*b*, 97*d*, 97*f*, 97*h* at which it is checked whether there is an outstanding sync already in that category for the DVM node. Provided that these conditions are met, the winning Op and Sync from the earlier arbitration stage are then arbitrated together at a second arbitration stage 99*a*, 99*b*, 99*c*, 99*d* (one arbitration stage for each category of snoop message). The thresholds for the number of outstanding requests permitted may be the same or different for each category.

Then, at respective calculation stages 81*a*-81*d*, for the winning snoop message of each category target IDs for that snoop message are calculated, and a snoop message, together with ready and last signalling are generated. Then, at a final arbitration stage 83, the generated flits are multiplexed and arbitrated for transmission. The snoop message selected for transmission is then passed through a snoop link layer interface 85, and transmitted onwards as indicated by the right-hand arrow 87.

By arbitrating each category of snoop message separately, greater fairness is ensured because otherwise the local snoops would overwhelm the others, since there are so many. Furthermore, according to the illustrated example scheme, snoops of a particular category can be output when the resources for that category are available (e.g. when the number outstanding in that category is below the threshold) rather than waiting for all categories triggered by a particular request to be transmitted simultaneously. If all categories were required to be transmitted at once, then received local requests would likely be starved out, since local requests give rise to more different categories of snoop message than other types, so have more requirements in order to be deemed complete.

Any or all of the arbitration stages illustrated in FIGS. 6 and 7 may be round robin arbiters, or any other suitable arbitration mechanism.

Figure 8:
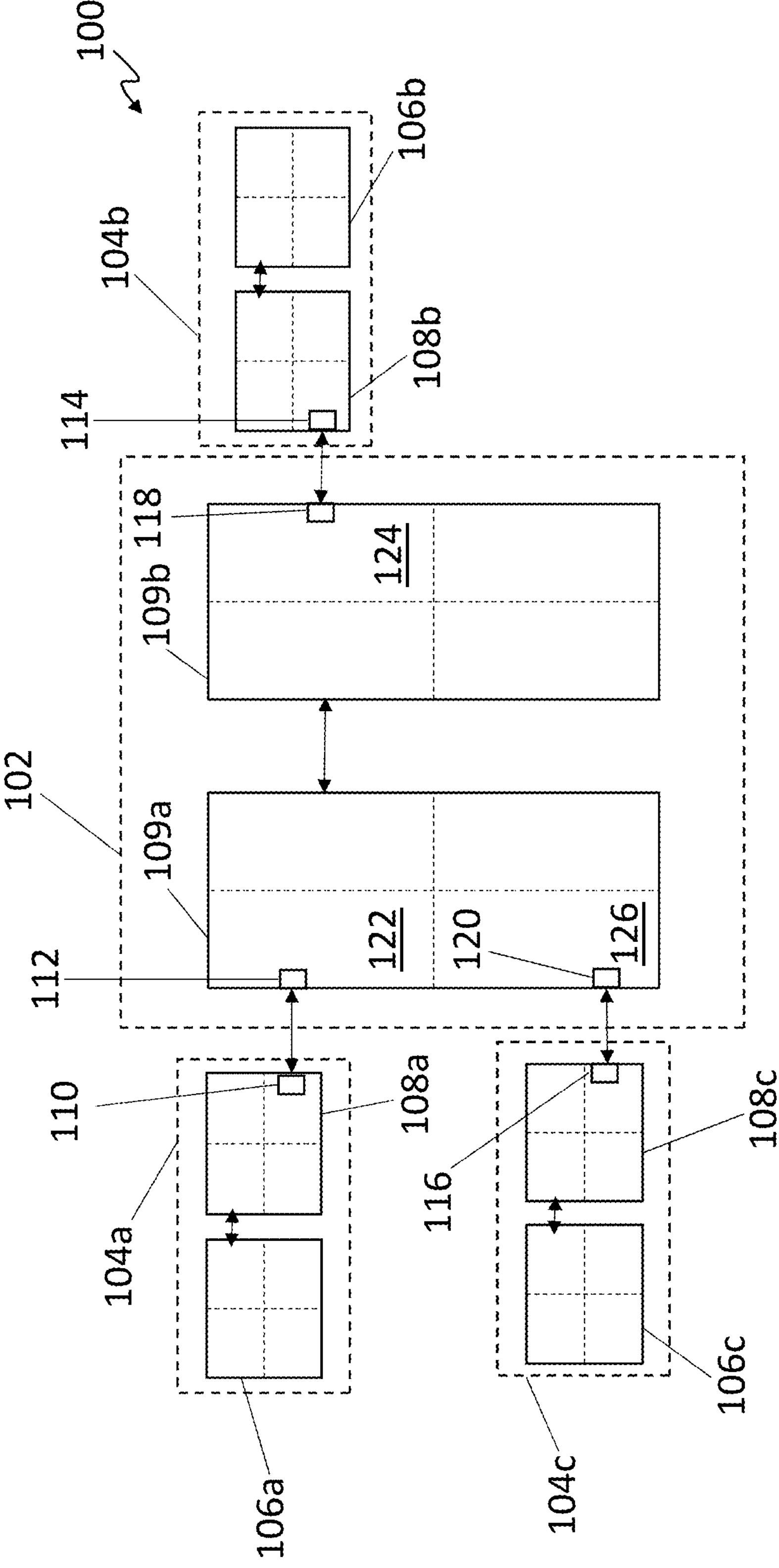
FIG. 8 is a schematic diagram of a data processing network including a hub data processing system and several branch data processing systems, according to an embodiment of the second aspect of the present invention.

FIG. 8 is a schematic diagram of a data processing network 100 including a hub data processing system 102 and several branch data processing systems 104*a*, 104*b*, 104*c*, according to an embodiment of the second aspect of the present invention. Some DVM nodes in this system may behave as set out above in reference to FIGS. 3-7. However, according to the second aspect, certain DVM nodes of the hub data processing network 100 are arranged to treat the CCGs in their domain as local, rather than remote, i.e. to treat them as part of the local group of devices to which local snoops are sent, and to treat requests received from them as local rather than remote DVM requests.

In the illustrated example, each branch data processing system 104*a*, 104*b*, 104*c*, includes two branch integrated-circuit data processing devices (i.e. chips) 106*a*-106*c*, 108*a*-108*c*. The hub data processing network also includes a first chip 109*a* and a second chip 109*b*. Each of the chips in this example include four DVM domain as represented by the sections separated by a dashed line. Although not shown it will be understood that each DVM domain contains requestor(s) and may also contain one or more CCG nodes of the kind illustrated in FIG. 5. In addition, the network includes several CCG pairs as described below which behave differently to those described above.

A first CCG pair 110, 112 connects a first domain 122 of a first chip 109*a* of the hub 102 with a domain of a chip 108*a* of the first branch circuit 104*a*. A second CCG pair 114, 118 connects a domain 124 of a second chip 109*b* of the hub 102 with a domain of a chip 108*b* (i.e. a second domain of the hub) of the second branch circuit 104*b*. A third CCG pair 116, 120 connects another domain 126 of the first chip 109*a* (i.e. a third domain of the hub) with a domain of a chip 108*c* of the third branch circuit 108*c*.

According to this example, the DVM nodes of the respective DVM domains 122, 124, 126 of the hub are configured to treat the respective CCGs 112, 118, 120 as local rather than remote—i.e. by transmitting local snoop messages to them (and not remote) and treating requests received from them as local requests. As a result, a snoop received from the associated branch circuits gives rise to a local request, rather than remote, meaning that it then propagates beyond the chip at which it is received, and since the CCG is treated as belonging to the local group of devices, it will receive snoops triggered by a peer-remote snoop (which triggers only local and not remote snoops). Thus, a snoop from the first branch circuit 104*a* will be received at the first domain 122 as a local request (even if transmitted from the branch as remote), and it will therefore be propagated to other domains of that chip 109*a* as a peer-local snoop, and then propagated to the third branch circuit 104*c* and to the second chip 109*b* of the hub as a remote request. At the second chip 109*b* of the hub, the request will pass to the second domain 124 as a peer-remote snoop, but since the CCG 118 is treated as a local receiver by its DVM node, it will still receive a (local) snoop message as a result of the received peer-remote snoop, and this will therefore be passed to the second branch circuit 106.

Thus, full propagation of DVM requests through the illustrated structure is ensured, despite the hub-and-spoke layout in which the branch circuits 104*a*, 104*b*, 104*c* are connected only via the central hub 102. This override to treat certain CCGs as local effectively creates a secondary hierarchy of DVM messages at the hub relative to each of the branch circuits. The CCGs 110, 114, 116 of the branch circuits 104*a*, 104*b*, 104*c* may likewise be treated as local by their respective DVM nodes, or may be treated as remote as described above in relation to FIG. 5.

Figure 9:
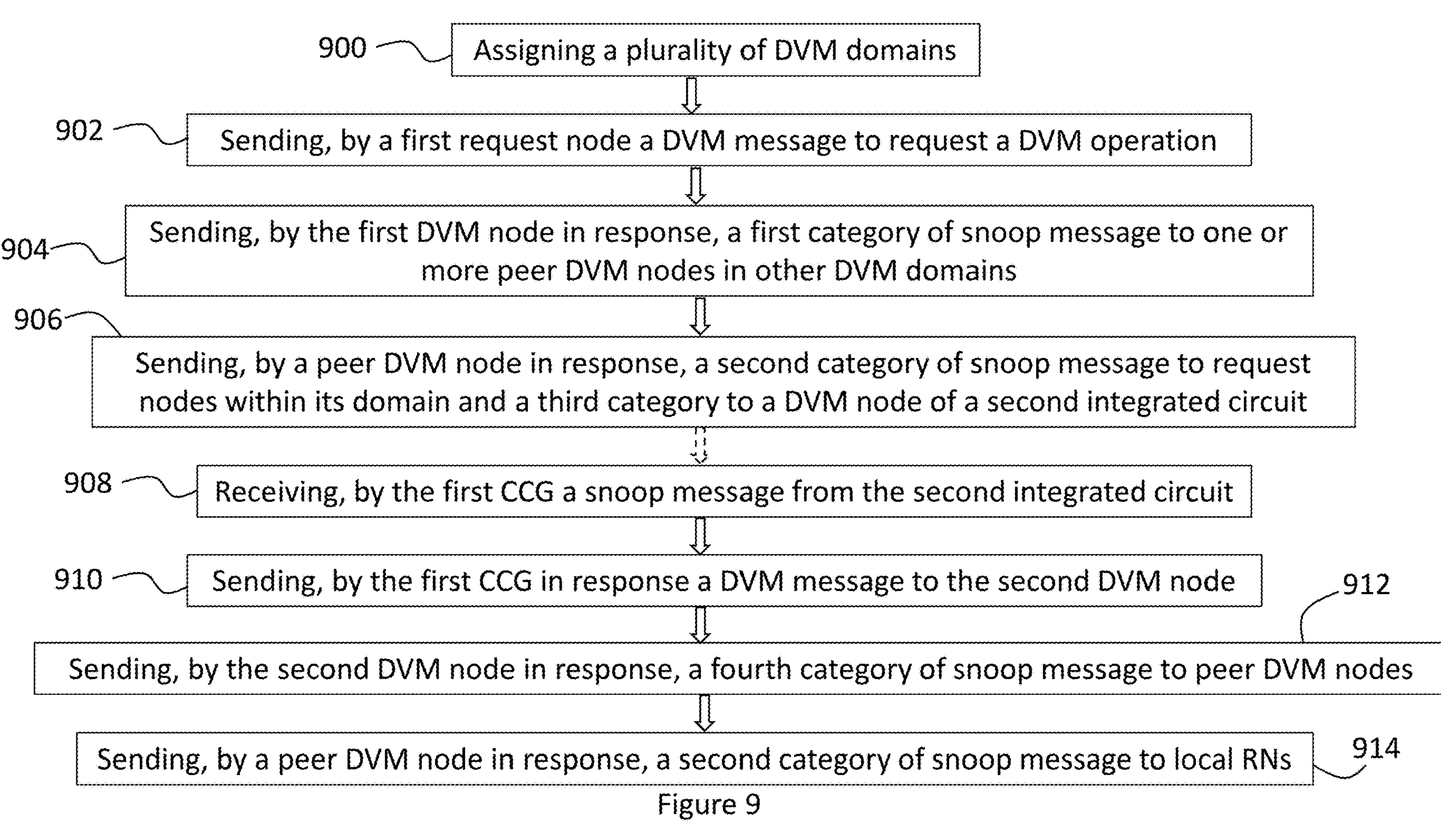
FIG. 9 is a flow diagram representing a method for managing distributed virtual memory (DVM) in a data processing network according to an embodiment of the present invention.

FIG. 9 is a flow diagram representing a method for managing distributed virtual memory (DVM) in a data processing network according to an embodiment of the present invention. The method includes, at step 900, assigning a plurality of DVM domains, each DVM domain including a DVM node of the plurality of DVM nodes and one or more request nodes of the plurality of request nodes, the plurality of DVM nodes including a first DVM node in a first-request-node DVM domain.

At step 902, sending, by a first request node in the first-request-node DVM domain to the first DVM node, a DVM message to request a DVM operation.

At step 904, sending, by the first DVM node in response to the DVM message, a first category of snoop message to one or more peer DVM nodes in DVM domains other than the first-request-node DVM domain.

At step 906, sending, by a second DVM node of the one or more peer DVM nodes responsive to receiving the first category of snoop message, a second category of snoop message to request nodes within the domain of the second DVM node and a third category of snoop message to a DVM node of a second integrated circuit, wherein the first chip-to-chip gateway is operatively coupled to the second DVM node and wherein the snoop message is sent via the first chip-to-chip gateway of the first integrated circuit.

At step 908, receiving, by the first chip-to-chip gateway a snoop message from the second integrated circuit. It will be understood that this need not follow the earlier steps, but could occur independently and at any time relative to the other steps, i.e. as part of a separate DVM management process.

At step 910, sending, by the first chip-to-chip gateway in response to the snoop message a DVM message to the second DVM node.

At step 912, sending, by the second DVM node responsive to receiving the DVM message, a fourth category of snoop message to one or more peer DVM nodes in DVM domains other than the DVM domain of the second DVM node.

At step 914, sending, by a peer DVM node responsive to receiving the fourth category of snoop message, a second category of snoop message to request nodes within the domain of the peer DVM node.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added, or operations can be deleted, without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. An integrated circuit data processing system comprising:

a plurality of request nodes, each request node including a local memory, the local memories of the plurality of request nodes accessible as a distributed virtual memory (DVM);

a plurality of DVM nodes, where the local memory of a request node is accessible by other request nodes via one or more DVM nodes of the plurality of DVM nodes;

assignment logic configured to assign one or more request nodes of the plurality of request nodes to each DVM node of the plurality of DVM nodes to form a DVM domain for each DVM node;

an interconnect system operatively coupling the one or more request nodes in a DVM domain to the DVM node in the DVM domain and operatively coupling between the DVM nodes; and a first chip-to-chip gateway;

wherein a first request node in a first-request-node DVM domain is configured to send a DVM message to the DVM node of the first-request-node DVM domain to request a DVM operation, and wherein the DVM node of the first-request-node DVM domain is configured, in response, to:

send a first category of snoop message to one or more peer DVM nodes in DVM domains other than the first-request-node DVM domain;

wherein a second DVM node, of the one or more peer DVM nodes, is configured, in response to receiving a snoop message belonging to the first category of snoop message, to:

send a second category of snoop message to request nodes within the domain of the second DVM node;

send a third category of snoop message to a DVM node of a second integrated circuit, wherein the first chip-to-chip gateway is operatively coupled to the second DVM node and wherein the snoop message is sent via the first chip-to-chip gateway of the first integrated circuit; and wherein the first chip-to-chip gateway is configured, upon receipt of a snoop message from the second integrated circuit, to send a DVM message to the second DVM node, and wherein the second DVM node is configured, in response, to:

send a fourth category of snoop message to one or more peer DVM nodes in DVM domains other than the DVM domain of the second DVM node;

wherein a peer DVM node, in response to receiving a snoop message belonging to the fourth category, is configured to send a second category of snoop message to request nodes within the domain of the peer DVM node.

2. The integrated circuit data processing system of claim 1, wherein the DVM node of the first-request-node DVM domain is configured, responsive to receipt of the DVM message from the first request node, to additionally send a second category of snoop message to request nodes, other than the first request node, in the first-request-node DVM domain.

3. The integrated circuit data processing system of claim 1, wherein the second DVM node is configured, responsive to receipt of a DVM message from a request node in the domain of the second DVM node, to send a third category of snoop message to a DVM node of the second integrated circuit, wherein the snoop message is sent via the first chip-to-chip gateway.

4. The integrated circuit data processing system of claim 1, wherein the second DVM node is configured, responsive to receiving the DVM message from the first chip-to-chip gateway, to additionally:

send a second category of snoop message to request nodes within the domain of the second DVM node.

5. The integrated circuit data processing system of claim 1, wherein each of the plurality of DVM nodes comprises a first tracker, for tracking outstanding snoop messages belonging to the first category, a second tracker, for tracking outstanding snoop messages belonging to the second category, a third tracker, for tracking outstanding snoop messages belonging to the third category, and a fourth tracker, for tracking outstanding snoop messages belonging to the fourth category.

6. The integrated circuit data processing system of claim 1, wherein each of the DVM nodes is configured to transmit snoop messages, responsive to a particular received DVM message or snoop message, in each of the categories independently.

7. The integrated circuit data processing system of claim 6, wherein each of the DVM nodes comprises arbitration logic configured to determine a snoop message for transmission, the arbitration logic comprising at least one stage at which snoop messages belonging to different categories are arbitrated independently.

8. The integrated circuit data processing system of claim 6, wherein each of the DVM nodes is configured to limit a number of outstanding snoop messages of each category issued by the DVM node to a respective independent threshold associated with each category, by limiting a count of outstanding snoop messages of each category to a respective threshold value.

9. The integrated circuit data processing system of claim 8, wherein each category of snoop message comprises a first sub-category, of synchronisation snoop message, and a second sub-category, of non-synchronisation snoop message, wherein each of the DVM nodes is configured to limit a number of outstanding snoop messages of each sub-category independently.

10. A data processing network, comprising:

the integrated circuit data processing system as claimed in claim 1; and the second integrated circuit, the second integrated circuit comprising a second-chip-to-chip gateway operatively coupled to a DVM node of the second integrated circuit, the first-chip-to-chip gateway communicatively coupled to the first-chip-to-chip gateway;

wherein the second DVM node is configured, in response to receiving a snoop message belonging to the first category of snoop message, to:

send the third category of snoop message to a DVM node of the second integrated circuit, via the first chip-to-chip gateway and the second chip-to-chip gateway; and wherein the first chip-to-chip gateway is configured, upon receipt of the snoop message from the second integrated circuit via the second-chip-to-chip gateway, to send a DVM message to the second DVM node.

11. A non-transitory computer-readable medium storing computer-readable code for fabrication of an integrated circuit data processing system as claimed in claim 1.

12. A data processing network, comprising:

a hub data processing network;

a first branch integrated-circuit data processing system; and a second branch integrated-circuit data processing system;

the hub data processing network comprising:

a plurality of request nodes, each request node including a local memory, the local memories of the plurality of request nodes accessible as a distributed virtual memory (DVM);

a plurality of DVM nodes, where the local memory of a request node is accessible by other request nodes via one or more DVM nodes of the plurality of DVM nodes;

assignment logic configured to assign one or more request nodes of the plurality of request nodes to each DVM node of the plurality of DVM nodes to form a DVM domain for each DVM node;

an interconnect system operatively coupling the one or more request nodes in a DVM domain to the DVM node in the DVM domain and operatively coupling between the DVM nodes;

wherein the first branch integrated circuit data processing system is connected to a first DVM domain of the hub data processing network through a first-branch-circuit chip-to-chip gateway of the first branch integrated circuit and a first hub chip-to-chip gateway of the hub data processing network;

wherein the second branch integrated circuit data processing system is connected to a second DVM domain of the hub data processing network through a second-branch-circuit chip-to-chip gateway of the second branch integrated circuit and a second hub chip-to-chip gateway of the hub data processing network;

wherein the first branch integrated circuit data processing system and the second branch integrated circuit data processing system are connected only through the hub data processing network;

wherein the DVM node of the first DVM domain is configured to treat the first hub chip-to-chip gateway, with respect to DVM messages received from the first hub chip-to-chip gateway requesting a DVM operation, and snoop messages sent to the first hub chip-to-chip gateway by the DVM node, as a request node within the first DVM domain; and wherein the DVM node of the second DVM domain is configured to treat the second hub chip-to-chip gateway, with respect to DVM messages received from the second hub chip-to-chip gateway requesting a DVM operation, and snoop messages sent to the second hub chip-to-chip gateway by the DVM node, as a request node within the second DVM domain.

13. The data processing network of claim 12, wherein the DVM node of the first DVM domain is configured, responsive to receipt of a DVM message from the first hub chip-to-chip gateway, to send a first category of snoop message to one or more peer DVM nodes in DVM domains other than the first DVM domain and to send a second category of snoop message to request nodes, other than the first hub chip-to-chip gateway, in the first DVM domain.

14. The data processing network of claim 12, wherein the first DVM node is configured, responsive to receipt of a DVM message from a request node in the domain of the first DVM node, to send a second category of snoop message to the first hub chip-to-chip gateway.

15. The data processing network of claim 12, the DVM node of the DVM domain of the first-branch-circuit chip-to-chip gateway is configured to treat the first branch-circuit chip-to-chip gateway, with respect to DVM messages received from the first branch-circuit chip-to-chip gateway requesting a DVM operation, and snoop messages sent to the first branch-circuit chip-to-chip gateway by the DVM node, as a remote request node.

16. The data processing network of claim 12, wherein the hub data processing network comprises an integrated-circuit data processing apparatus, comprising a chip-to-chip gateway, and a DVM node within the DVM domain of the integrated-circuit chip-to-chip gateway;

wherein a first request node in the DVM domain of the integrated-circuit chip-to-chip gateway is configured to send a DVM message to the DVM node, and wherein the DVM node is configured, in response, to:

send a first category of snoop message to one or more peer DVM nodes in DVM domains other than the DVM domain of the integrated-circuit chip-to-chip gateway;

wherein a second DVM node, of the one or more peer DVM nodes, is configured, in response to receiving a snoop message belonging to the first category of snoop message, to:

send a second category of snoop message to request nodes within the domain of the second DVM node;

send a third category of snoop message to a DVM node of a second integrated circuit, wherein the integrated-circuit chip-to-chip gateway is operatively coupled to the second DVM node and wherein the snoop message is sent via the integrated-circuit chip-to-chip gateway; and wherein the integrated-circuit chip-to-chip gateway is configured, upon receipt of a snoop message from the second integrated circuit, to send a DVM message to the second DVM node, and wherein the second DVM node is configured, in response, to:

send a fourth category of snoop message to one or more peer DVM nodes in DVM domains other than the DVM domain of the second DVM node;

wherein a peer DVM node, in response to receiving a snoop message belonging to the fourth category, is configured to send a second category of snoop message to request nodes within the domain of the peer DVM node.

17. The data processing network of claim 12, wherein the hub data processing network comprises an integrated circuit data processing system, and wherein the integrated circuit data processing system comprises the first DVM domain, the first integrated-circuit chip-to-chip gateway, the second DVM domain and the second-branch-circuit chip-to-chip gateway.

18. The data processing network of claim 12, wherein the hub data processing network comprises a first integrated circuit data processing system and a second integrated circuit data processing system, wherein the first integrated circuit data processing system comprises the first DVM domain and the first integrated-circuit chip-to-chip gateway, and wherein the second integrated circuit data processing system comprises the second DVM domain and the second-branch-circuit chip-to-chip gateway.

19. A method for managing distributed virtual memory (DVM) in a data processing network having a plurality of request nodes and a plurality of DVM nodes, the distributed virtual memory associated with local memories of the plurality of request nodes, the method comprising:

assigning a plurality of DVM domains, each DVM domain including a DVM node of the plurality of DVM nodes and one or more request nodes of the plurality of request nodes, the plurality of DVM nodes including a first DVM node in a first-request-node DVM domain;

sending, by a first request node in the first-request-node DVM domain to the first DVM node, a DVM message to request a DVM operation;

sending, by the first DVM node in response to the DVM message, a first category of snoop message to one or more peer DVM nodes in DVM domains other than the first-request-node DVM domain;

sending, by a second DVM node of the one or more peer DVM nodes responsive to receiving the first category of snoop message, a second category of snoop message to request nodes within the domain of the second DVM node and a third category of snoop message to a DVM node of a second integrated circuit, wherein the first chip-to-chip gateway is operatively coupled to the second DVM node and wherein the snoop message is sent via the first chip-to-chip gateway of the first integrated circuit;

receiving, by the first chip-to-chip gateway a snoop message from the second integrated circuit;

sending, by the first chip-to-chip gateway in response to the snoop message a DVM message to the second DVM node;

sending, by the second DVM node responsive to receiving the DVM message, a fourth category of snoop message to one or more peer DVM nodes in DVM domains other than the DVM domain of the second DVM node;

sending, by a peer DVM node responsive to receiving the fourth category of snoop message, a second category of snoop message to request nodes within the domain of the peer DVM node.

20. A non-transitory computer-readable medium storing computer-readable code for fabrication of a data processing network as claimed in claim 12.

* * * * *